(12) United States Patent
Yushin et al.

(10) Patent No.: US 12,046,759 B2
(45) Date of Patent: Jul. 23, 2024

(54) ELECTRODE WITH CONDUCTIVE INTERLAYER AND METHOD THEREOF

(71) Applicant: Sila Nanotechnologies, Inc., Alameda, CA (US)

(72) Inventors: Gleb Yushin, Atlanta, GA (US); Justin Yen, Alameda, CA (US); Jens Steiger, Alameda, CA (US); Eniko Zsoldos, Waterloo (CA); Mareva Fevre, Oakland, CA (US); Adam Kajdos, Alameda, CA (US); Weimin Wang, San Mateo, CA (US)

(73) Assignee: SILA NANOTECHNOLOGIES, INC., Alameda, CA (US)

( * ) Notice: Subject to any disclaimer, the term of this patent is extended or adjusted under 35 U.S.C. 154(b) by 0 days.

(21) Appl. No.: 17/898,050

(22) Filed: Aug. 29, 2022

(65) Prior Publication Data
US 2022/0416256 A1   Dec. 29, 2022

Related U.S. Application Data

(63) Continuation of application No. 16/563,791, filed on Sep. 6, 2019, now abandoned.

(Continued)

(51) Int. Cl.
*H01M 4/38* (2006.01)
*H01M 4/134* (2010.01)
(Continued)

(52) U.S. Cl.
CPC ......... *H01M 4/8828* (2013.01); *H01M 4/134* (2013.01); *H01M 4/1395* (2013.01);
(Continued)

(58) Field of Classification Search
None
See application file for complete search history.

(56) References Cited

U.S. PATENT DOCUMENTS

2004/0234857 A1* 11/2004 Shiozaki ............. H01M 4/1391
429/223
2010/0159337 A1*  6/2010 Matsumoto ....... H01M 10/4235
429/207

(Continued)

FOREIGN PATENT DOCUMENTS

CN     103682364 A    3/2014
CN     108417838 A    8/2018
(Continued)

*Primary Examiner* — Ula C Ruddock
*Assistant Examiner* — Mary Grace Byram
(74) *Attorney, Agent, or Firm* — MUNCY, GEISSLER, OLDS & LOWE, P.C.; Daniel Podhajny

(57) ABSTRACT

In an embodiment, a Li-ion battery electrode comprises a conductive interlayer arranged between a current collector and an electrode active material layer. The conductive interlayer comprises first conductive additives and a first polymer binder, and the electrode active material layer comprises a plurality of active material particles mixed with a second polymer binder (which may be the same as or different from the first polymer binder) and second conductive additives (which may be the same as or different from the first conductive additives). In a further embodiment, the Li-ion battery electrode may be fabricated via application of successive slurry formulations onto the current collector, with the resultant product then being calendared (or densified).

24 Claims, 11 Drawing Sheets

Related U.S. Application Data

(60) Provisional application No. 62/728,025, filed on Sep. 6, 2018.

(51) Int. Cl.
*H01M 4/1395* (2010.01)
*H01M 4/62* (2006.01)
*H01M 4/66* (2006.01)
*H01M 4/88* (2006.01)
*H01M 10/0525* (2010.01)

(52) U.S. Cl.
CPC ........... *H01M 4/386* (2013.01); *H01M 4/622* (2013.01); *H01M 4/625* (2013.01); *H01M 4/661* (2013.01); *H01M 4/663* (2013.01); *H01M 4/667* (2013.01); *H01M 4/668* (2013.01); *H01M 10/0525* (2013.01); *Y02E 60/10* (2013.01); *Y02E 60/50* (2013.01)

(56) References Cited

U.S. PATENT DOCUMENTS

| | | | | |
|---|---|---|---|---|
| 2012/0301790 | A1* | 11/2012 | Xiao | H01M 4/139 29/623.5 |
| 2013/0040229 | A1* | 2/2013 | Grigorian | H01G 11/32 361/503 |
| 2013/0224584 | A1* | 8/2013 | Sung | H01M 4/13 429/211 |
| 2015/0111101 | A1* | 4/2015 | Ikenuma | H01M 4/13 429/233 |
| 2016/0260981 | A1* | 9/2016 | Lee | H01M 4/661 |
| 2016/0365573 | A1* | 12/2016 | Li | H01M 4/0471 |
| 2017/0352911 | A1* | 12/2017 | Choi | H01M 4/587 |
| 2018/0062168 | A1* | 3/2018 | Gonser | H01M 4/386 |
| 2018/0205111 | A1 | 7/2018 | Yushin et al. | |
| 2019/0088925 | A1* | 3/2019 | Harutyunyan | H01M 50/121 |

FOREIGN PATENT DOCUMENTS

| | | |
|---|---|---|
| JP | H11214011 A | 8/1999 |
| WO | 2018098506 A1 | 5/2018 |

* cited by examiner

TOP OF THE ELECTRODE 301 (NEAR THE SEPARATOR)

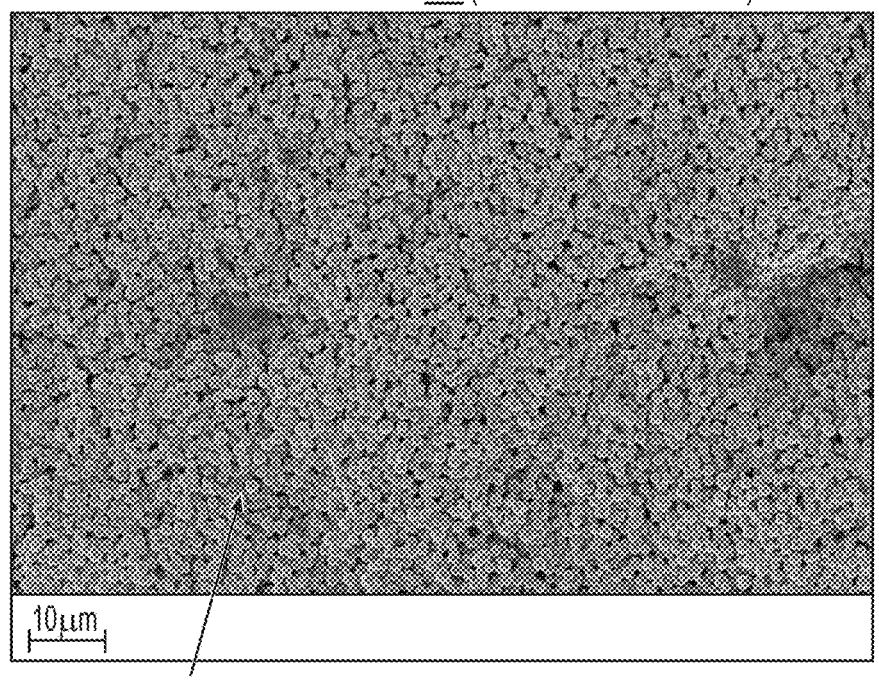

NEAR-SPHERICAL (NANO)COMPOSITE SI-
COMPRISING ELECTRODE PARTICLES 303

BOTTOM OF THE ELECTRODE 301 (NEAR THE CURRENT COLLECTOR FOIL)

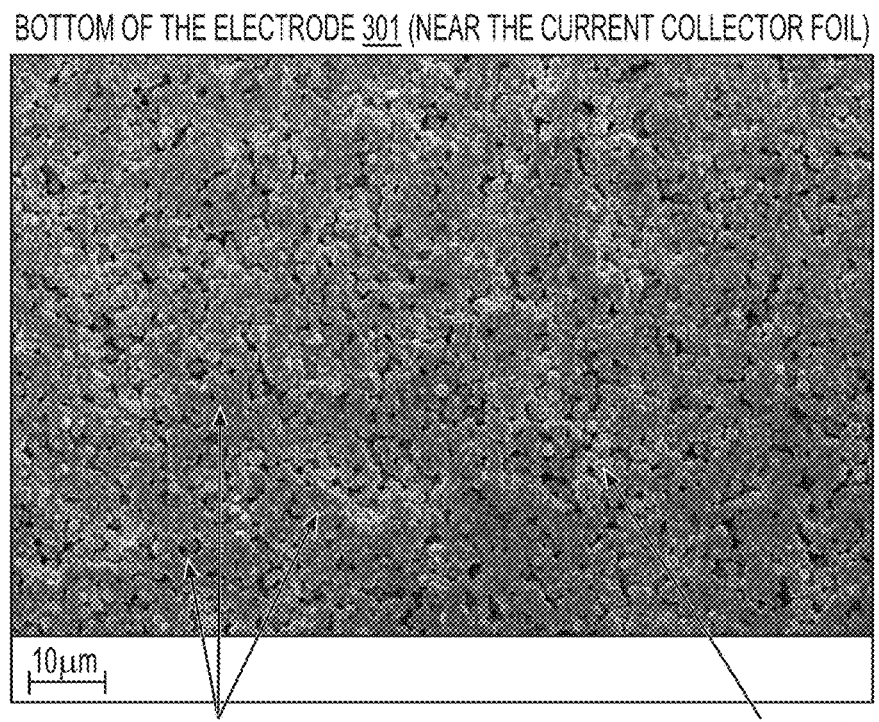

BINDER-CONDUCTIVE ADDITIVE INTERLAYER
REGIONS 302 ATTACHED TO THE ELECTRODE
AFTER REMOVING IT FROM THE COPPER
CURRENT COLLECTOR FOIL

NEAR-SPHERICAL (NANO)COMPOSITE SI-
COMPRISING ELECTRODE PARTICLES 303

FIG. 3

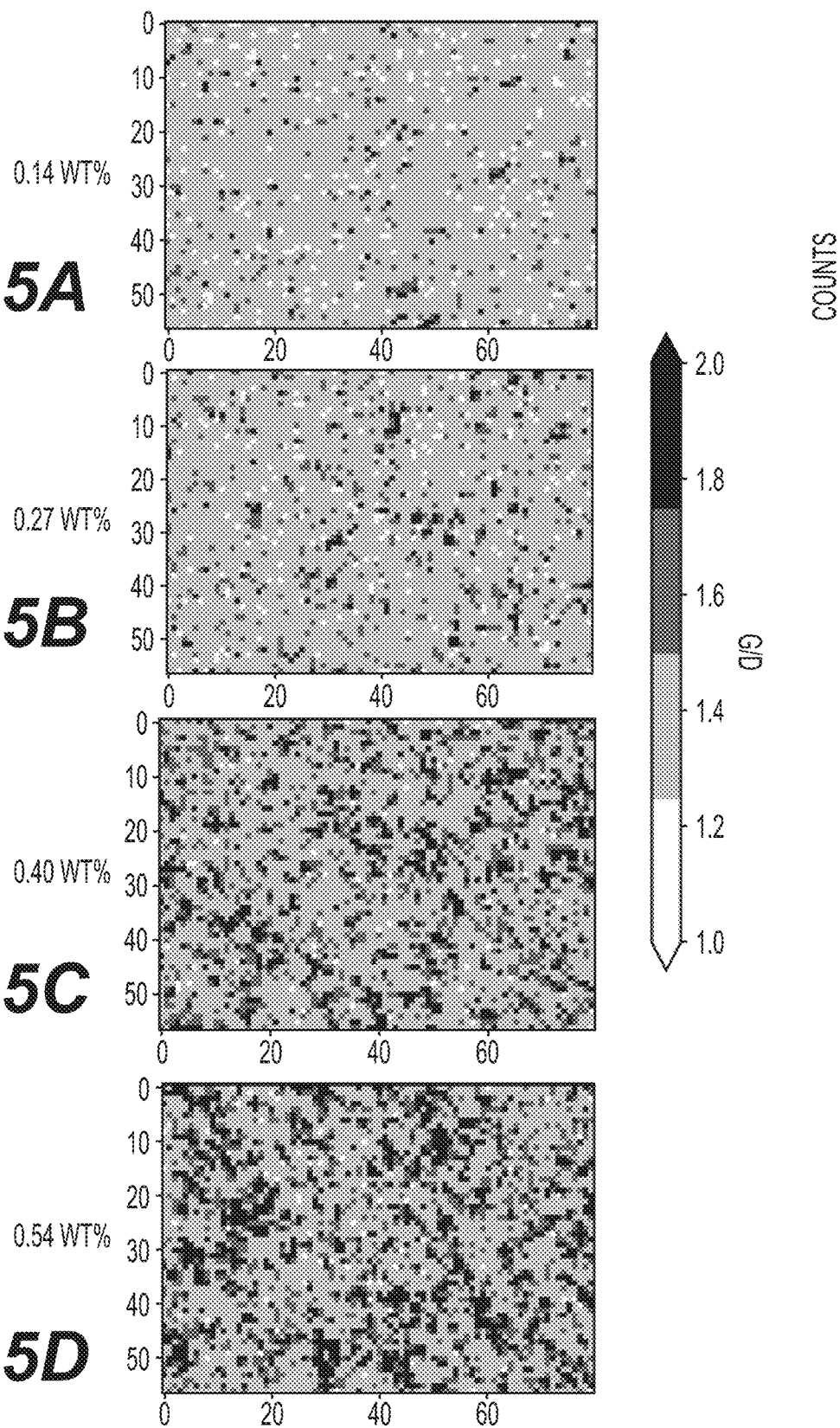

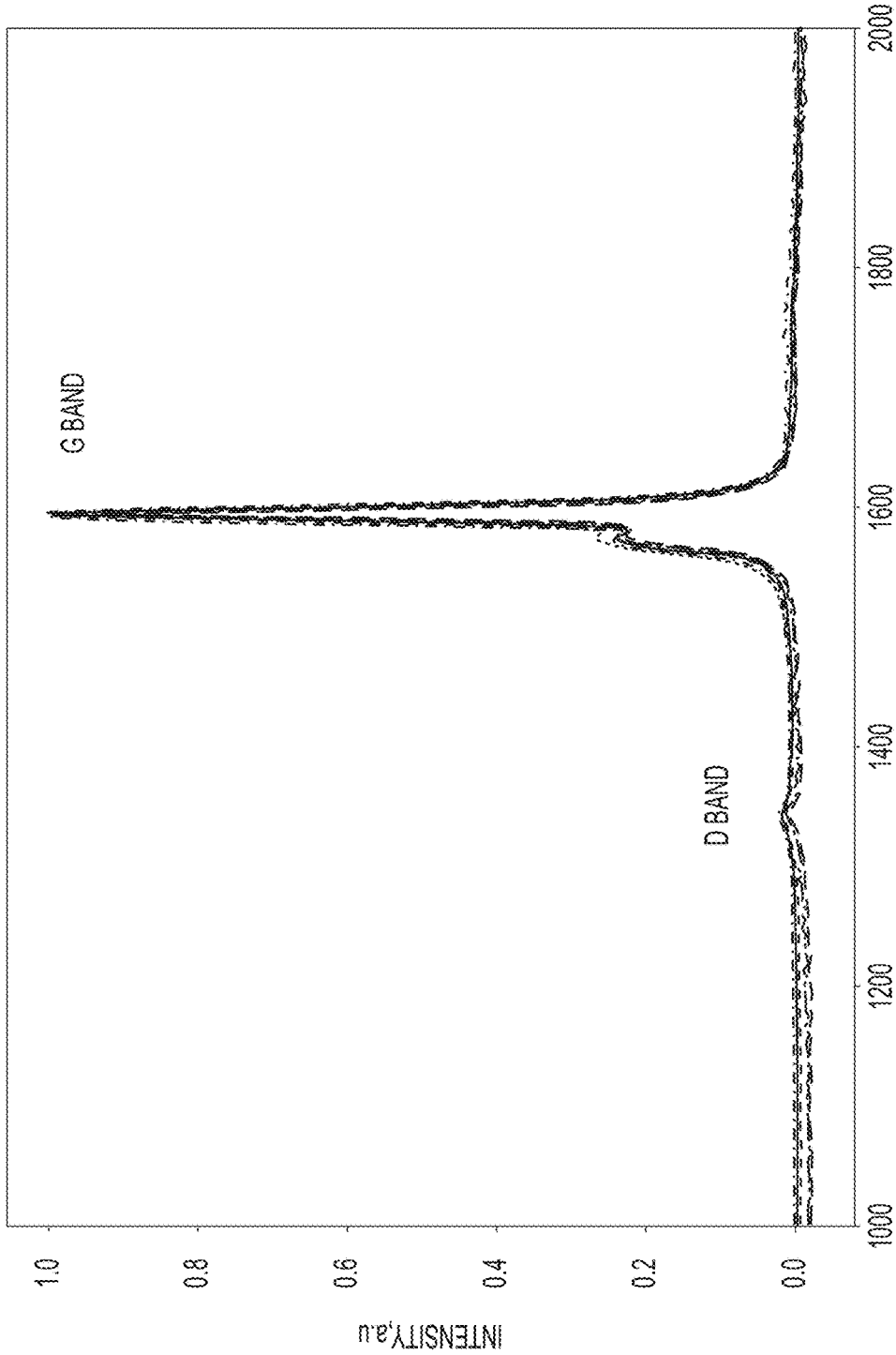

ental application Ser. No. 16/563,791,

ELECTRODE WITH CONDUCTIVE INTERLAYER AND METHOD THEREOF

CROSS-REFERENCE TO RELATED APPLICATIONS

The present application for Patent is a Continuation of U.S. Non-Provisional application Ser. No. 16/563,791, entitled "ELECTRODE WITH CONDUCTIVE INTERLAYER AND METHOD THEREOF," filed Sep. 6, 2019, which in turn claims the benefit of U.S. Provisional Application No. 62/728,025, entitled "HIGH-CAPACITY BATTERY ELECTRODES WITH IMPROVED BINDERS, CONSTRUCTION, AND PERFORMANCE," filed Sep. 6, 2018, each of which is expressly incorporated herein by reference in its entirety.

BACKGROUND

Field

The present disclosure relates generally to energy storage devices, and more particularly to battery technology and the like.

Background

Owing in part to their relatively high energy densities, relatively high specific energy, light weight, and potential for long lifetimes, advanced rechargeable batteries are desirable for a wide range of consumer electronics, electric vehicle, grid storage and other important applications.

However, despite the increasing commercial prevalence of batteries, further development of these batteries is needed, particularly for potential applications in low- or zero-emission, hybrid-electrical or fully-electrical vehicles, consumer electronics, energy-efficient cargo ships and locomotives, aerospace applications, and power grids. In particular, further improvements are desired for various rechargeable batteries, such as rechargeable metal and metal-ion batteries (such as rechargeable Li and Li-ion batteries, rechargeable Na and Na-ion batteries, rechargeable Mg and Mg-ion batteries, etc.), rechargeable aqueous batteries, rechargeable alkaline batteries, rechargeable metal hydride batteries, and lead acid batteries, to name a few.

A broad range of active (charge-storing) materials, a broad range of polymer binders, a broad range of conductive additives and various mixing recipes may be utilized in the construction of battery electrodes. However, for improved electrode performance (low and stable resistance, high cycling stability, high rate capability, etc.), the optimal choice of binders, additives, and mixing protocols needs to be determined for specific types and specific sizes of active particles. In many cases, these choices are not trivial and can be counter-intuitive.

In many different types of rechargeable batteries, charge storing materials may be produced as high-capacity (nano) composite powders, which exhibit moderately high volume changes (8-160 vol. %) during the first cycle and moderate volume changes (5-50 vol. %) FIG. 4 idual particle level during the subsequent charge-discharge cycles. A subset of such charge-storing particles includes particles with an average size in the range from around 0.2 to around 20 microns. Such a class of charge-storing particles offers great promises for scalable manufacturing and achieving high cell-level energy density and other performance characteristics. Unfortunately, such particles are relatively new and their formation into electrodes typically results in poor performance characteristics and limited cycle stability. The performance often becomes particularly poor when the electrode capacity loading becomes moderate (2-4 mAh/$cm^2$) or even more so when it becomes high (e.g., 4-12 mAh/$cm^2$). Higher capacity loading, however, is advantageous for increasing cell energy density and reducing cell manufacturing costs.

Examples of materials that exhibit moderately high volume changes (8-160 vol. %) during the first cycle and moderate volume changes (5-50 vol. %) during the subsequent charge-discharge cycles include (nano)composites comprising so-called alloying-type active electrode materials. In the case of metal-ion batteries (such as Li-ion batteries), examples of such alloying-type active electrode materials include, but are not limited to, silicon, germanium, antimony, aluminum, magnesium, zinc, gallium, arsenic, phosphorous, silver, cadmium, indium, tin, lead, bismuth, their alloys, and others. Silicon-based electrodes are particularly attractive for most applications due to their very high gravimetric and volumetric capacities and moderate cost. Alloying-type electrode materials typically offer higher gravimetric and volumetric capacity than so-called intercalation-type electrodes used in commercial Li-ion batteries, such as graphite.

Accordingly, there remains a need for improved batteries, components, and other related materials and manufacturing processes.

SUMMARY

An embodiment is directed to a Li-ion battery electrode, comprising a current collector, a conductive interlayer arranged on the current collector, the conductive interlayer including first conductive additives and a first polymer binder, and an electrode active material layer arranged on the conductive interlayer, the electrode active material layer including a plurality of active material particles mixed with a second polymer binder and second conductive additives, the plurality of active material particles exhibiting an average particle size in the range from about 0.2 microns to about 10 microns, an average volume expansion in the range of about 8 vol. % to about 180 vol. % during one or more charge-discharge cycles of the Li-ion battery cell, and an average areal capacity loading in the range of about 3 mAh/$cm^2$ to about 12 mAh/$cm^2$.

Another embodiment is directed to a process of manufacturing of a Li-ion battery electrode, comprising mixing a first polymer binder, a first solvent and first conductive additives to form a first uniform conductive interlayer slurry, coating a current collector with the first slurry at a first thickness to form a conductive interlayer, drying the first slurry coating to attain a conductive interlayer on the current collector, mixing a second polymer binder, a second solvent, second conductive additives and active material particles to form a second uniform active material slurry, coating the conductive interlayer with the second slurry at a second thickness, drying the second slurry coating to attain an electrode active material layer, and calendaring the conductive interlayer and/or the electrode active material layer until a desired density is achieved.

BRIEF DESCRIPTION OF THE DRAWINGS

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

FIG. 3 illustrates scanning electron microscopy (SEM) images of the top and bottom electrode surfaces after the separation from the current collector copper foil, showing significantly higher fraction of the binder left from an interlayer left on the bottom surface in accordance with an embodiment of the present disclosure.

FIGS. 5A, 5B, 5C and 5D illustrate Raman mapping of the electrode surface with increasing content of carbon nanotube conductive additives in accordance with an embodiment of the present disclosure.

FIG. 6 illustrates Raman spectra taken from different areas of an example carbon nanotube-comprising interlayer (buffer layer), showing a very strong G band, in accordance with an embodiment of the present disclosure.

DETAILED DESCRIPTION

Figure 1:
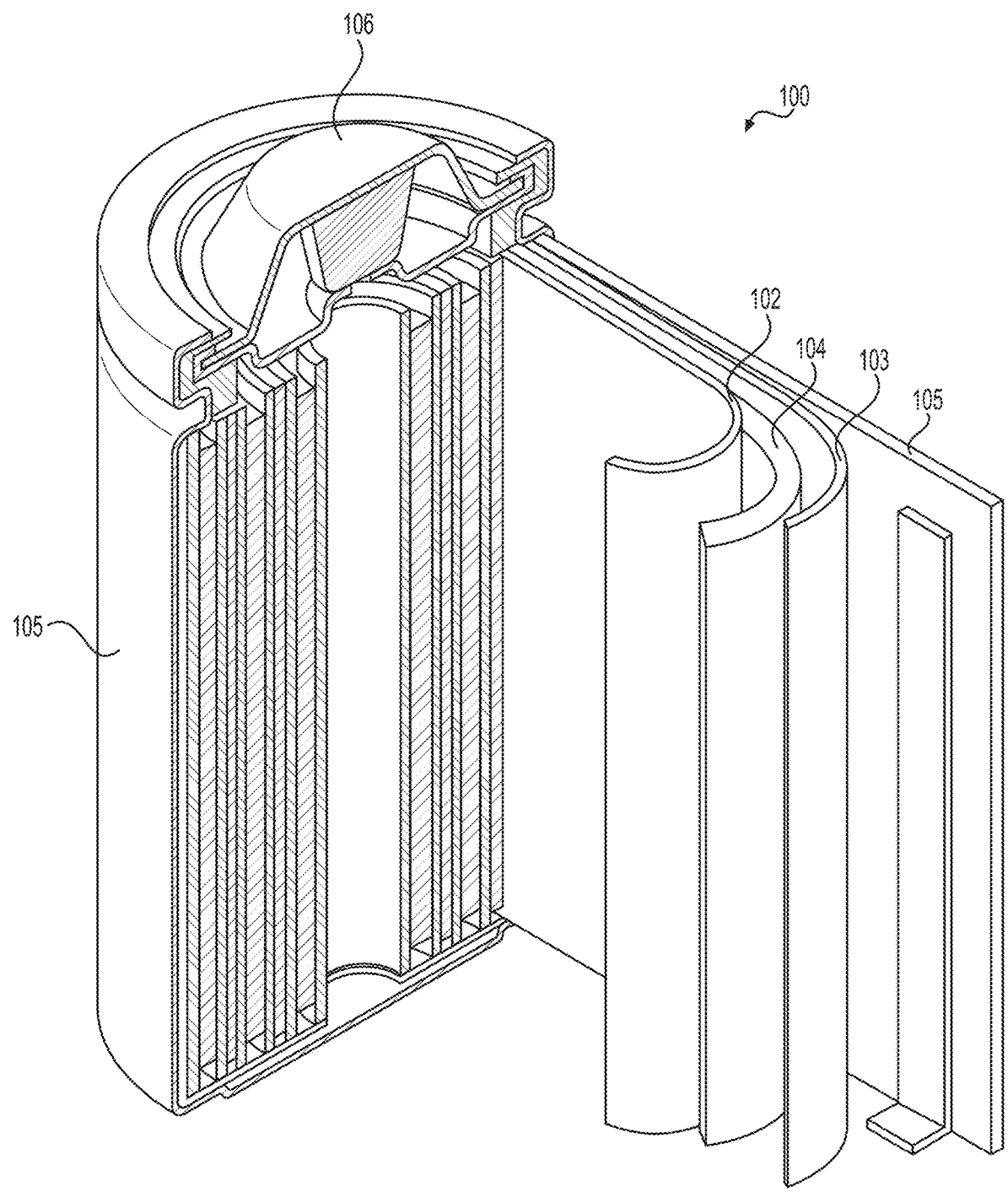
FIG. 1 illustrates an example (e.g., Li-ion) battery in which the components, materials, methods, and other techniques described herein, or combinations thereof, may be applied according to various embodiments.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 50 μm to 1200 μm (i.e., a level of precision in units or increments of ones) encompasses (in μm) a set of [50, 51, 52, 43, . . . , 1199, 1200], as if the intervening numbers 51 through 1199 in units or increments of ones were expressly disclosed. In another example, a numerical percentage range from 0.01% to 10.00% (i.e., a level of precision in units or increments of hundredths) encompasses (in %) a set of [0.01, 0.02, 0.03, . . . , 9.99, 10.00], as if the intervening numbers between 0.02 and 9.99 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range.

While the description below may describe certain examples in the context of Li and Li-ion batteries (for brevity and convenience, and because of the current popularity of Li technology), it will be appreciated that various aspects may be applicable to other rechargeable and primary batteries (such as Na-ion, Mg-ion, K-ion, Ca-ion and other metal-ion batteries, alkaline batteries, etc.). Further, while the description below may also describe certain examples of the material formulations in a Li-free state (for example, as in silicon-comprising nanocomposite anodes) during electrode assembling, it will be appreciated that various aspects may be applicable to Li-containing electrodes (for example, lithiated Si anodes, Li-containing cathodes including but not limited to various types of conversion-type cathodes, etc.).

While the description below may describe certain examples in the context of electrodes (or, more generally, batteries) filled with liquid electrolytes, it will be appreciated that various aspects may be applicable to solid electrolyte-comprising electrode (or, more generally, battery) compositions. Examples of such solid electrolytes may include, but are not limited to, gel polymer electrolytes, solid polymer electrolytes, single ion conducing polymer electrolytes (where, for example, anions are chemically attached to the polymer framework), inorganic solid electrolytes (including the ones introduced via a melt-infiltration technology into the electrodes or cells), composite solid electrolytes (including the ones comprising both inorganic and polymer components), among others. While the description below may describe certain examples in the context of electrodes (or, more generally, batteries) filled with liquid electrolytes based on single salts (e.g., $LiPF_6$ or others for Li-ion batteries) dissolved in the mixture of organic solvents, it will be appreciated that various aspects may be applicable to liquid electrolytes comprising two or more salts (e.g., two, three or more Li salts or mixtures of Li and non-Li salts) as well as to liquid electrolytes comprising ionic liquids or inorganic solvents. The combination of such "unusual" for Li-ion battery electrolytes (various solid electrolytes or composite electrolytes or liquid electrolytes comprising more than one salts or ionic liquids or inorganic solvents) with conductive interlayer between the electrode or current collectors (or, more generally, attaining substantially higher volume fraction of conductive additives or polymer binder or both near the current collectors) may be particularly advantageous for attaining enhanced stability or rate performance or safety or other attractive cell characteristics.

While the description below may describe certain examples in the context of some specific silicon-comprising anodes (such as silicon-comprising composite particles with specific dimensions, surface area and volume changes during cycling), it will be appreciated that various aspects may be applicable to other types of silicon-comprising anodes, such as silicon-comprising anodes with silicon content in the range from around 2.0 at. % to around 93.0 at. % (in some designs, from around 10 at. % to around 85 at. %) as atomic fraction of the total dry anode coating composition, including all active materials, all conductive additives, all other additives and all binder(s), but not including the current collectors).

While the description below may describe certain examples in the context of some specific alloying-type chemistries of anode active materials for Li-ion batteries (such as silicon-comprising anodes), it will be appreciated that various aspects may be applicable to other chemistries for Li-ion batteries (conversion-type anodes and cathodes, other alloying-type electrodes, mixed anodes or cathodes comprising both intercalation and conversion or alloying type active materials, anodes or cathodes comprising intercalation-type active materials, including (but not limited to) cathodes with gravimetric capacity in excess of about 200 mAh/g (e.g., in a fully lithiated stage) not counting the weight of the current collectors and anodes with the gravimetric capacity in excess of about 400 mAh/g (e.g., in a fully lithiated stage) not counting the weight of the current collectors, lithium metal anodes, etc.) as well as to other battery chemistries. In the case of metal-ion batteries (such as Li-ion batteries), examples of other suitable conversion-type active materials for electrodes include, but are not limited to, various metal fluorides and oxyfluorides (including, but not limited to those comprising lithium fluoride (LiF) mixed with metals (e.g., nickel (Ni), iron (Fe), copper (Cu), bismuth (Bi), silver (Ag) and others and their various alloys), $FeF_3$, $FeF_2$, Fe—F—O, $CuF_2$, $BiF_3$, $BiF_5$, Cu—Fe—$F_x$, Cu—Fe—$F_x$—$O_y$, $NiF_2$, Cu—Fe—Ni—$F_x$, Cu—Fe—Ni—$F_x$—$O_y$, and many others and their various mixtures and alloys), sulfur and metal sulfides (including, but not limited to $Li_2S$), selenium and metal selenides (including, but not limited to $Li_2Se$), various selenium-sulfur mixed electrodes (including, but not limited to $Li_2S$—$Li_2Se$ solid solutions, line compounds or mixtures), metal oxides, metal nitrides, metal phosphides, metal hydrides, and others, as well as their various alloys (incl. solid solutions), mixtures and combinations.

While the description below may describe certain examples in the context of some specific pre-fabrication of conductive interlayer(s) between the bulk of the electrode and current collectors (or, more generally, in the context of attaining substantially higher volume fraction of conductive additives or polymer binder or both near the current collectors by depositing a coating on the current collector prior to depositing active material or active material slurry), it would be appreciated that such an interlayer (or, more generally, attaining substantially higher volume fraction of conductive additives or polymer binder or both near the current collectors) may be attained during or after the electrode preparation (e.g., during deposition of the interlayer and active material layer, or during drying and preferential (enhanced) sedimentation of conductive additives or polymers on the current collector (compared to the active particle surface), or during electrode densification (e.g., when conductive additives and polymer binders deform more readily during calendaring/densification) or at other stages of the electrode fabrication).

While the description below may describe certain examples in the context of wet slurry-based electrode fabrication, it would be appreciated that various aspects may be applicable to dry electrode fabrications.

While the description below may describe certain examples in the context of some specific electrode compositions, specific slurry compositions, specific slurry mixing procedures, specific calendaring procedures, specific current collectors, specific distribution of binder or conductive additives in the electrodes, specific polymer binder compositions, specific conductive additive compositions, specific electrode loadings, specific electrolytes and other specific battery cell manufacturing, composition or architectural features, it will be appreciated that various aspects may be advantageously applicable to combinations of two, three or more of such features.

During battery (such as a Li-ion battery) operation, so-called conversion materials change (convert) from one crystal structure to another (hence the name "conversion"-type). During (e.g., Li-ion) battery operation, Li ions may be inserted into so-called alloying type materials forming lithium alloys (hence the name "alloying"-type). Sometimes, "alloying"-type electrode materials are considered to be a sub-class of "conversion"-type electrode materials.

While the description below may describe certain examples in the context of primary or rechargeable metal or metal-ion batteries (such as nonchargeable or rechargeable Li metal or Li-ion batteries or nonchargeable or rechargeable Na metal or Na-ion batteries, among others), other conversion-type or alloying-type electrodes that may benefit from various aspects of the present disclosure include: various chemistries used in a broad range of aqueous batteries, such as alkaline batteries, metal hydride batteries, lead acid batteries, etc. These include, but are not limited to, various metals (such as iron, zinc, cadmium, lead, indium, etc.) and metal alloys, metal oxides, metal hydroxides, metal oxyhydroxides, and metal hydrides, to name a few.

FIG. 1 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (not shown) impregnating the separator 104, a battery case 105, and a sealing member 106 sealing the battery case 105.

Both liquid and solid electrolytes may be used for the designs herein. Conventional electrolytes for Li- or Na-based batteries of this type are generally composed of a single Li or Na salt (such as $LiPF_6$ for Li-ion batteries and $NaPF_6$ or $NaClO_4$ salts for Na-ion batteries) in a mixture of organic solvents (such as a mixture of carbonates). Other common organic solvents include nitriles, esters, sulfones, sulfoxides, phosphorous-based solvents, silicon-based solvents, ethers, and others. Such solvents may be modified (e.g., be sulfonated or fluorinated). The electrolytes may also comprise ionic liquids (in some designs, neutral ionic liquids; in other designs, acidic and basic ionic liquids). The electrolytes may also comprise mixtures of various salts (e.g., mixtures of several Li salts or mixtures of Li and non-Li salts for rechargeable Li and Li-ion batteries).

In the case of aqueous Li-ion (or aqueous Na-ion, K-ion, Ca-ion, etc.) batteries, electrolytes may include a solution (e.g., aqueous solution or mixed aqueous-organic solution) of inorganic Li (or Na, K, Ca, etc.) salt(s) (such as $Li_2SO_4$, $LiNO_3$, $LiCl$, $LiBr$, $Li_3PO_4$, $H_2LiO_4P$, $C_2F_3LiO_2$, $C_2F_3LiO_3S$, $Na_2O_3Se$, $Na_2SO_4$, $Na_2O_7Si_3$, $Na_3O_9P_3$, $C_2F_3NaO_2$ etc.). These electrolytes may also comprise solutions of organic Li (or Na, K, Ca, etc.) salts, such as (listed with respect to Li for brevity) metal salts of carboxylic acids (such as HCOOLi, CH$_3$COOLi, CH$_3$CH$_2$COOLi, CH$_3$(CH$_2$)$_2$COOLi, CH$_3$(CH$_2$)$_3$COOLi, CH$_3$(CH$_2$)$_4$COOLi, CH$_3$(CH$_2$)$_5$COOLi, CH$_3$(CH$_2$)$_6$COOLi, CH$_3$(CH$_2$)$_7$COOLi, CH$_3$(CH$_2$)$_8$COOLi, CH$_3$(CH$_2$)$_9$COOLi, CH$_3$(CH$_2$)$_{10}$COOLi, CH$_3$(CH$_2$)$_{11}$COOLi, CH$_3$(CH$_2$)$_{12}$COOLi, CH$_3$(CH$_2$)$_{13}$COOLi, CH$_3$(CH$_2$)$_{14}$COOLi, CH$_3$(CH$_2$)$_{15}$COOLi, CH$_3$(CH$_2$)$_{16}$COOLi, CH$_3$(CH$_2$)$_{17}$COOLi, CH$_3$(CH$_2$)$_{18}$COOLi and others with the formula CH$_3$(CH$_2$)$_x$COOLi, where x ranges up to 50); metal salts of sulfonic acids (e.g., RS(=O)$_2$—OH, where R is a metal salt of an organic radical, such as a CH$_3$SO$_3$Li, CH$_3$CH$_2$SO$_3$Li, C$_6$H$_5$SO$_3$Li, CH$_3$C$_6$H$_4$SO$_3$Li, CF$_3$SO$_3$Li, [CH$_2$CH(C$_6$H$_4$)SO$_3$Li]$_n$ and others) and various other organometalic reagents (such as various organilithium reagents), to name a few. Such solutions may also comprise mixtures of inorganic and organic salts, various other salt mixtures (for example, a mixture of a Li salt and a salt of non-Li metals and semimetals), and, in some cases, hydroxide(s) (such as LiOH, NaOH, KOH, Ca(OH)$_2$, etc.), and, in some cases, acids (including organic acids). In some designs, such aqueous electrolytes may also comprise neutral or acidic or basic ionic liquids (from approximately 0.00001 wt. % to approximately 40 wt. % relative to the total weight of electrolyte). In some designs, such "aqueous" (or water containing) electrolytes may also comprise organic solvents (from approximately 0.00001 wt. % to approximately 40 wt. % relative to the total weight of electrolyte), in addition to water. Illustrative examples of suitable organic solvents may include carbonates (e.g., propylene carbonate, ethylene carbonate, diethyl carbonate, dimethyl carbonate, ethyl methyl carbonate, fluoriethylene carbonate, vinylene carbonate, and others), various nitriles (e.g., acetonitrile, etc.), various esters, various sulfones (e.g., propane sulfone, etc.), various sultones, various sulfoxides, various phosphorous-based solvents, various silicon-based solvents, various ethers, and others.

The most common salt used in a Li-ion battery electrolyte, for example, is LiPF$_6$, while less common salts include lithium tetrafluoroborate (LiBF$_4$), lithium perchlorate (LiClO$_4$), lithium bis(oxalato)borate (LiB(C$_2$O$_4$)$_2$), lithium difluoro(oxalate)borate (LiBF$_2$(C$_2$O$_4$)), various lithium imides (such as SO$_2$FN$^-$(Li$^+$)SO$_2$F, CF$_3$SO$_2$N$^-$(Li$^+$)SO$_2$CF$_3$, CF$_3$CF$_2$SO$_2$N$^-$(Li$^+$)SO$_2$CF$_3$, CF$_3$CF$_2$SO$_2$N$^-$(Li$^+$)SO$_2$CF$_2$CF$_3$, CF$_3$SO$_2$N$^-$(Li$^+$)SO$_2$CF$_2$OCF$_3$, CF$_3$OCF$_2$SO$_2$N$^-$(Li$^+$)SO$_2$CF$_2$OCF$_3$, C$_6$F$_5$SO$_2$N$^-$(Li$^+$)SO$_2$CF$_3$, C$_6$F$_5$SO$_2$N$^-$(Li$^+$)SO$_2$C$_6$F$_5$ or CF$_3$SO$_2$N$^-$(Li$^+$)SO$_2$PhCF$_3$, and others), and many others. Electrolytes for Na-ion, Mg-ion, K-ion, Ca-ion, and Al-ion batteries are often more exotic as these batteries are in earlier stages of development. They may comprise different salts and solvents (in some cases, ionic liquids may replace organic solvents for certain applications).

Conventional electrodes utilized in Li-ion batteries are typically produced by (i) formation of a slurry comprising active materials, conductive additives, binder solutions and, in some cases, surfactant or other functional additives; (ii) casting a slurry onto a metal foil (e.g., Cu foil for most anodes and Al foil for most cathodes); and (iii) drying the casted electrodes to completely evaporate the solvent.

Conventional anode materials utilized in Li-ion batteries are of an intercalation-type. Examples of these include but are not limited to lithium titanate, synthetic and natural graphite, hard carbons and others. Metal ions are intercalated into and occupy the interstitial positions of such materials during the charge or discharge of a battery. Such anodes experience very small volume changes when used in electrodes. However, such anodes exhibit relatively small gravimetric and volumetric capacities (typically less than 370 mAh/g rechargeable specific capacity in the case of graphite- or hard carbon-based anodes and less than 600 mAh/cm$^3$ rechargeable volumetric capacity).

Conventional cathode materials utilized in Li-ion batteries are also of an intercalation-type. Examples of these include but are not limited to lithium cobalt oxide (LCO), lithium manganese oxide (LMO), lithium nickel cobalt aluminum oxide (NCA), lithium nickel oxide (LNO), lithium nickel manganese oxide (LNM), lithium nickel cobalt manganese oxide (NCM), various other layered lithium and nickel comprising oxides (some comprising Mn, Cr, Al, Mg and other metals), lithium iron phosphate (LFP) and other olivine type cathodes, among others. Metal ions are intercalated into and occupy the interstitial positions of such materials during the charge or discharge of a battery.

Polyvinylidene fluoride, or polyvinylidene difluoride (PVDF), and carboxymethyl cellulose (CMC) (typically as a mixture of CMC and styrene butadiene rubber (SBR)) are the two most common binders used in intercalation-type electrodes (CMC is most commonly used in the intercalation-type anodes and PVDF is most commonly used in the intercalation-type cathodes).

However, many other binders and their mixtures may be effectively used in the context of one or more embodiments of the present invention for intercalation-type, alloying-type, conversion-type and mixed-type anodes and cathodes. These include, but are not limited to, polyacrylic acid (PAA) and various salts of PAA (Na-PAA, K-PAA, Li-PAA and many others and their various mixtures), (poly)alginic acid and various salts of (poly)alginic acid (Na-alginate, Li-alginate, Ca-alginate, K-alginate and many others and their various mixtures), maleic acid and their various salts, various (poly)acrylates (including, but not limited to dimethylaminoethyl acrylate and many others), various (poly)acrylamides, various polyesters, styrene butadiene rubber (SBR), (poly)ethylene oxide (PEO), (poly)vinyl alcohol (PVA), cyclodextrin, maleic anhydride, methacrylic acid and its various salts (Li, Na, K, etc.), various (poly)ethylenimines (PEI), various (poly)amide imides (PAI), various (poly)amide amines, various other polyamine-based polymers, various (poly)ethyleneimines, sulfonic acid and their various salts, various catechol group-comprising polymers, various lignin-comprising or lignin-derived polymers, various epoxies, various cellulose-derived polymers (including, but not limited to nanocellulose fibers and nanocrystals, carboxyethyl cellulose, etc.), chitosan, other polymers (e.g., preferably water-soluble polymers) and their various co-polymers and mixtures. A particular polymer binder choice for battery electrode in a given cell design may depend on various parameters, including the voltage range electrodes are exposed to, volume changes during electrochemical cycling, operational temperature range, electrolyte used and others. in some designs, a suitable molecular weight (MW) of such polymer binders may generally range from as low as about 50 to as much as about 50,000,000. In some designs, it may be advantageous to use aqueous solutions of water-soluble polymers as binders. Carbon black is the most common conductive additive used in battery electrodes.

Alloying-type anode materials for use in Li-ion batteries offer higher gravimetric and volumetric capacities compared to intercalation-type anodes. For example, silicon (Si) offers approximately 10 times higher gravimetric capacity and approximately 3 times higher volumetric capacity compared to an intercalation-type graphite (or graphite-like) anode. However, Si suffers from significant volume expansion during Li insertion (up to approximately 300 vol. %) and thus may induce thickness changes and mechanical failure of Si-comprising anodes. In addition, Si (and some Li—Si alloy compounds that may form during lithiation of Si) suffer from relatively low electrical conductivity and relatively low ionic (Li-ion) conductivity. Electronic and ionic conductivity of Si is lower than that of graphite. Formation of (nano)composite Si-comprising particles (including, but not limited to Si—C composites, Si-metal composites, Si-polymer composites, Si-ceramic composites, Si—C-polymer composites or other types of porous composites comprising nanostructured Si or nanostructured or nano-sized Si particles of various shapes and forms and preferably comprising carbon) may reduce volume changes during Li-ion insertion and extraction, which, in turn, may lead to better cycle stability in rechargeable Li-ion cells.

In addition to Si-comprising (nano)composite anodes, other examples of such nanocomposite anodes comprising alloying-type active materials include, but are not limited to, those that comprise germanium, antimony, aluminum, magnesium, zinc, gallium, arsenic, phosphorous, silver, cadmium, indium, tin, lead, bismuth, their alloys, and others.

In addition to (nano)composite anodes comprising alloying-type active materials, other interesting types of high capacity (nano)composite anodes may comprise metal oxides (including silicon oxide including partially oxidized silicon, lithium oxide, etc.), metal nitrides, metal phosphides, metal sulfides, metal hydrides, and others.

In particular, high-capacity (nano)composite anode powders, which exhibit moderately high volume changes (e.g., about 8-160 vol. %) during the first cycle, moderate volume changes (e.g., about 4-50 vol. %) during the subsequent charge-discharge cycles and an average size in the range from around 0.2 to around 40 microns (more preferably from around 0.4 to around 20 microns) may be particularly attractive for battery applications in terms of manufacturability and performance characteristics. In case of Si-comprising (nano)composite anode powders, it may be particularly useful for the battery designs to use those with the specific capacity in the range from about 500 mAh/g to about 3000 mAh/g. In some designs, the specific capacity of such powders may range from about 600 mAh/g to about 2000 mAh/g. The Si-containing (nano)composite powders that additionally comprise conductive (e.g., primarily $sp^2$-bonded) carbon may be particularly attractive for some applications. In some designs, an anode coating layer may advantageously exhibit volumetric capacity (after lithiation and the resulting expansion) in the range from about 600 mAh/cc to about 1800 mAh/cc (in some designs, from about 700 mAh/cc to about 1400 mAh/cc). In some designs, electrodes with electrode capacity loading from moderate (e.g., about 2-4 mAh/cm$^2$) to high (e.g., about 4-10 mAh/cm$^2$) are also particularly attractive for use in cells. Furthermore, in some designs, electrodes with a majority of near-spherically (spheroidally)-shaped composite particles may additionally be very attractive for optimizing rate performance and volumetric capacity of the electrodes.

In spite of some improvements that may be achieved with the formation and utilization of such alloying-type or conversion-type nanocomposite anode materials, however, substantial additional improvements in cell performance characteristics may be achieved with the improved composition and preparation of electrodes, beyond what is known or shown by the conventional state-of-the-art. The relatively low density of such composite anode materials (e.g., about 0.5-2.5 g/cc) may make uniform slurry mixing, coating deposition, and calendaring (electrode densification) more challenging and require special methodologies for optimal performance. In addition, such nanocomposites may be coated with a carbon outer layer, which is less polar compared to conventional intercalation-type cathodes and thus may make such nanocomposite particles more difficult to disperse in some solvents. The volume changes accompanying electrochemical cycling of high-capacity (nano)composite anodes may induce stresses within electrodes that may lead to delamination from the current collector, formation of cracks and eventual cell failure.

Unfortunately, high-capacity (nano)composite anode or cathode powders (including those that comprise Si and C), which exhibit moderately high volume changes (e.g., about 8-160 vol. %) during the first cycle, moderate volume changes (e.g., about 4-50 vol. %) during the subsequent charge-discharge cycles, an average size in the range from around 0.2 to around 20 microns and relatively low density (e.g., about 0.5-3.8 g/cc), are relatively new and their formation into electrodes using conventional binders, conductive additives, mixing and calendaring (densification) protocols typically result in unfavorable morphology and mechanical properties and relatively poor performance characteristics and limited cycle stability, particularly if electrode capacity loading is moderate (e.g., about 2-4 mAh/cm$^2$) and even more so if it is high (e.g., about 4-10 mAh/cm$^2$). Substantial volume changes (particularly during the initial cycles) typically lead to inferior performance.

One or more embodiments of the present disclosure are directed to overcoming at least some of the above-discussed challenges of various types of nanocomposite electrode materials (for example, those that comprise alloying-type active materials, such as Si, as well as carbon) that experience certain volume changes during cycling (for example, moderately high volume changes (e.g., about 8-160 vol. %) during the first cycle and moderate volume changes (e.g., about 4-50 vol. %) during the subsequent charge-discharge cycles) and an average size in the range from around 0.2 to around 20 microns for a broad range of batteries. It also allows one to formulate substantially more stable electrodes in moderate (e.g., about 2-4 mAh/cm$^2$) and, very importantly, high capacity loadings (e.g., about 4-10 mAh/cm$^2$).

In one or more embodiments, electrodes based on high capacity nanocomposite powders (e.g., comprising conversion- or alloying-type active materials and including elements such as Si and C) that experience certain volume changes during cycling (moderately high volume changes (e.g., an increase by about 8-160 vol. % or a reduction by about 8-70 vol. %) during the first cycle and moderate volume changes (e.g., about 4-50 vol. %) during the subsequent charge-discharge cycles) and an average size in the range from around 0.2 to around 20 micron (such as Si-based nanocomposite anode powders, among many others) may require very specific types of binders for significantly improved performance (particularly for high capacity loadings), as well as a very specific range of most favorable binder content, a specific type of carbon additives and specific amount of carbon additives and finally an interlayer between a Cu current collector and electrode.

For example, (i) continuous volume changes in high capacity nanocomposite particles during cycling in combination with (ii) electrolyte decomposition on the electrically conductive electrode surface at electrode operating potentials (e.g., mostly electrochemical electrolyte reduction in case of Si-based anodes) may lead to a continuous (even if relatively slow) growth of a solid electrolyte interphase (SEI) layer on the surface of the nanocomposite particles. If binders are used that swell substantially (e.g., by around 5-100 vol. % or reduce their modulus by over around 15-20%) in electrolytes (e.g., PVDF binders and the like), the interface between the nanocomposite particles and conductive carbon additives becomes filled with an SEI (electrolyte decomposition products) even if the binder coats and separates this interface from direct access of electrolyte. This is because electrolyte slowly permeates/penetrates through such "swellable" binders. The SEI growth at the composite electrode particles/conductive additive(s) interface leads to a gradual increase in the separation distance between the surface of the composite electrode particle and the attached conductive additive particle(s). In some designs, a higher degree of swelling in electrolyte (stronger reduction in modulus) may typically lead to faster separation for high capacity volume-changing nanocomposite particles. This increase in separation distance may undesirably increase the composite electrode particle/conductive additive particle(s) contact resistance. More importantly, at some point the separation may reach a critical value that corresponds to the situation when a conductive additive particle(s) and composite electrode particle become effectively electrically separated (e.g., when the separation distance exceeds substantially a distance that typically provides at least a moderate (e.g., greater than about 0.1%) probability for "quantum tunneling" of electrons between the separated particles). A similar phenomenon may happen at the particle-to-particle interfaces as well as the particle-to-current-collector interface in the electrode. Once an electrode particle becomes electrically separated from other particles and the current collector of the electrode, it effectively stops being able to accept or donate electrons and thus cannot participate in electrochemical reactions (which are required for charge storage in a battery). As such, the electrode capacity becomes reduced by the capacity of this separated particle. The gradual electrical (or electrochemical) separation of the various active composite electrode particles within the electrode leads to undesirable irreversible losses of electrode (and thus battery) capacity and eventual cell "end of life". Higher binder swelling in electrolytes may lead to faster cell degradation and shorter cycle stability. Because higher temperatures typically increase SEI growth rate and electrolyte diffusion through the binders, stable cell operation at above around 40-50° C. (often required for commercial cells) becomes particularly challenging to achieve. In contrast, conventional (intercalation-type) electrode materials exhibit a stable SEI and thus could be used with a broad range of binders, including those that exhibit substantial swelling in battery electrolytes.

Swelling of binders in electrolytes depends on both the binder and electrolyte compositions. Furthermore, such swelling (and the resulting performance reduction) often correlates with the reduction in elastic modulus upon exposure of binders to electrolytes. In this sense, the smaller the reduction in modulus, the more stable the binder-linked (protected) composite active particles/conductive additives interface becomes. The reduction in binder modulus by over about 15-20% may typically result in a noticeable reduction in performance in some applications. For example, the reduction in the binder modulus by two times (2×) may typically result in a substantial performance reduction. In a further example, a reduction in modulus by five or more times (e.g. 5×-500×) may result in a very significant performance reduction. Such "swellable in electrolyte" binders may exhibit either higher or (more often) lower maximum elongations (maximum strain) when exposed to electrolyte (reduction of maximum elongation may be undesirable). Exposure of electrodes with such binders to electrolyte may also weaken the interfaces between these binders and (nano) composite electrode particles, conductive additives and current collectors, which may be undesirable in some designs.

On the other hand, "swellable in electrolytes" binders may typically undergo substantial (e.g., about 5-200 vol. %) expansion (either in a dry state or when exposed to electrolyte) before failure (e.g. in a tensile test), which can be important in one or more embodiments because certain electrodes of interest exhibit a moderate (but substantial) change in volume during cycling.

As a compromise, in some designs, the use of binders that are slightly (e.g., about 2-25 vol. %) swellable in electrolytes (e.g., polyvinyl alcohol (PVA)) may offer reasonable performance. In some designs, such binders (including PVA) may work particularly well, if such binders are used in combination with other binders (or as co-polymers) and/or more effective conductive additives, such as carbon nanofibers and carbon nanotubes or metal nanowires; if the size of the high capacity particles is not too large (e.g., <about 6 micron); if carbon nanotubes (e.g., single-walled carbon nanotubes, double-walled carbon nanotubes or multiwalled carbon nanotubes) or carbon nanofibers or their various combinations (including those that may additionally comprise carbon black, exfoliated graphite, carbon ribbons or graphene) in the amount of about 0.1-15 wt. %, if the capacity loading is within about 3-8 mAh/cm$^2$ and, preferably, if an interlayer exists between the electrode and a metal (e.g., Cu) coated current collector.

Binders that exhibit no or small (e.g., about 0.001-2 vol. %) swelling upon exposure to electrolytes (such as various salts of Carboxymethyl cellulose (CMC) including, but not limited to Na-CMC, Li-CMC, K-CMC, etc., poliacrylic acid (PAA) and their various salts (Na-PAA, Li-PAA, K-PAA, etc.), various acrylic binders, various alginates (alginic acid and various salts of alginic acids) and most of other water-dissolvable binders in case of Li-ion batteries based on organic electrolytes) may also be used in some designs. However, such binders may be very brittle (even when exposed to electrolyte) and, in some designs, electrodes with the described alloying-type composite materials may be carefully optimized in terms of the binder amount, porosity, bonding between the binder and the particle surface, the amount and type of elongated particles (such as nanotubes, nanofibes and other fiber-shaped conductive particles as well as flake-like particles) and their mixtures, the amount and type of secondary (e.g., more elastic) binders, and the presence of an interlayer that may exist between the electrode and a metal (e.g., Cu) coated current collector. In some designs, such binders also tend to work better with a smaller size of composite particles (e.g., about 100 nm-4 micron, on average). Larger particles, on the other hand, exhibit a smaller specific surface area in contact with electrolyte and thus offer a lower rate of undesirable side reactions in some designs (e.g., a smaller volume fraction of the SEI or other types of surface layers, less electrolyte decomposition, less dissolution of electrode materials, etc.). In addition, larger particles are easier to handle and process into electrodes. Finally, larger particles may typically require less binder and conductive additives for sufficiently stable performance, which may be advantageous in terms of maximizing gravimetric electrode capacitance, rate performance and, in some cases, cell stability. Therefore, the use of large particles may be preferable, although these may not perform well with some of the binders, particularly if no interlayer exists between the Cu current collectors and the electrode.

In some designs, it may be advantageous for the binder for volume-changing electrode particles in the active material layer to comprise two or more distinct components with substantially different shape, substantially different solubility in a slurry solvent (by 2 or more times; in some designs, one component may not be soluble at all), substantially different (by 2 or more times) swelling in electrolyte and/or substantially different mechanical properties (e.g., elastic modulus, elasticity, etc. differing by 2 or more times). In some designs, it may be advantageous to use elastic nanoparticles (e.g., with an average size in the range from around 10 nm to around 500 nm) in combination with more brittle and/or water-soluble binders (e.g., including those described above—CMC, Na-CMC, Li-CMC, K-CMC, alginic acid, Na-alginate, Li-alginate, PAA, Na-PAA, Li-PAA, various acrylic binders, various alginates, etc.) to overcome their brittle nature and be effectively utilized with both small and large (e.g., Si-containing) composite particles. In some designs, elastic nanofibers or nanoribbons (e.g., with an average diameter in the range from around 2 nm to around 500 nm, an average length in the range from around 10.0 nm to around 500,000.0 nm and an average aspect ratio in the range from around 3:1 to around 10,000:1) or elastic flakes (e.g., with an average thickness in the range from around 1 nm to around 500 nm, an average length in the range from around 10.0 nm to around 500,000.0 nm and an average aspect ratio in the range from around 3:1 to around 10,000:1; in some designs with holes) may be advantageously used instead of or in addition to conventional elastic nanoparticles. Suitable examples of composition of such particles include but are not limited to SBR, polybutadiene, polyethylene, polyethylene propylene, styrene ethylene butylene, ethyelene vinyl acetate, polytetrafluoroethylene, perfluoroalkoxyethylene, isoprene, butyl rubber, nitril rubber, ethylene propylene rubber, polyacrylic rubber, silicone rubber, fluorosilicone rubber, polyether block amide, polysiloxanes and their various copolymers (such as polydimethylsiloxane), chlorosulfonated polyethylene, ethylene-vinyl acetate, their various mixtures and copolymers, among other suitable elastomers. In some designs, a suitable mass fraction of such elastic nanoparticles (or nanofibers or nanoflakes) may range from around 5 wt. % to around 99 wt. % (as a fraction of the total binder content in the electrode). While some conventional electrodes (e.g., graphite anodes) may comprise spherical SBR particles (which may be made elastic, in some designs), these commonly comprise only from around 15% to around 50 wt. % of the total weight fraction of the binder. In contrast, in the context of the present disclosure for larger volume-changing particles it may be highly advantageous to use a substantially larger fraction of elastic particles. In some designs it may be advantageous for the weight fraction of the elastic nanoparticles (or nanofibers or nanoflakes) (made of SBR or other elastic materials, including those described above) to range from around 50 wt. % to around 97 wt. % (in some designs, from around 70 wt. % to around 95 wt. %; including, for example, about 75 wt. % to about 90 wt. %). The size of the volume-changing nanocomposite particles, the value of the volume changes and their shape impact the optimal fraction of elastic particles. Typically, larger volume changes, larger particles and more spherical particles (in contrast, for example, to flake-shaped or random shaped particles) require larger fraction of elastic particles in the binder.

In some designs, it may be advantageous for such elastic particles to exhibit certain mechanical properties. In some designs, maximum elongation (elongation at break) of elastic nanoparticles (or nanofibers or nanoflakes) may preferably range from around 20.0% to around 10,000.0% (in some designs, from around 50.0% to around 5000.0%). In some designs, a strain at yield of elastic nanoparticles (or nanofibers or nanoflakes) may preferably exceed about 20% (in some design, the strain at yield of the elastic nanoparticles may exceed about 100%). In some designs, it may be advantageous to use a smaller fraction of conductive additives in an electrode because conductive additives occupy space (and thus reduce volumetric and gravimetric capacity of electrodes) and may induce undesirable side reactions (e.g., SEI formation, electrolyte decomposition, etc.) on their surface. Therefore, the use of small (e.g., below about 5 wt. %, even more preferably below about 2 wt. %, and even more preferably below about 1 wt. %) amounts of conductive additives may be preferable for cell operation, although electrodes with a smaller fraction of conductive additives may not perform well with some of the brittle (in electrolyte) binders in combination with high-capacity volume-changing composite electrode particles, especially for high capacity loadings.

In some applications, a (e.g., aqueous) binder suspension may include surfactant in order to achieve a uniform binder distribution in a slurry. In some cell designs, however, surfactant may at least partially dissolve during cycling or weaken adhesion of the solid electrolyte interphase (SEI) layer and thus induce undesirable cell degradation. In this case, the amount of the surfactant may be kept below a threshold (e.g., to below about 5 wt. % of all the binder in the electrode; in some designs—to below about 1 wt. %. of all the binder in the electrode).

In some designs, it may be advantageous for volume-changing (nano)composite electrodes to utilize polymer binders that exhibit a relatively low glass transition temperature (e.g., below around 70° C.; in some designs—below around 20° C.) to accommodate the mechanical stresses during calendaring (densification) and electrochemical cycling.

In some designs, the use of polyacrylates and polymethacrylates (and their derivatives and co-polymers) as binders for (nano)composite electrode materials may be advantageous. Such polymers are available with various side chain lengths and functionalities and may be tuned to achieve a desired solubility, mechanical properties, adhesion and stability.

In some designs, it may be advantageous to add conductive additives (for example, conductive additives comprising one dimensional (1D) conductive particles, such as conductive nanotubes, conductive ribbons, conductive fibers, conductive nanowires, etc.) in several stages during the electrode slurry mixing. In one illustrative example, it may be advantageous to (i) mix some conductive additives and active (nano)composite materials (and optionally some binder) in a solvent in a first stage and (ii) add binder (or binder solution or binder suspension) and (optionally) additional conductive additives (or suspension of conductive additives) and (optionally) additional solvent in the second or other stage. In another illustrative example, it may be advantageous to (i) mix some conductive additives with a binder (or a binder solution or suspension) in a first stage, (ii) add active (nano)composite materials (and, in some process designs, additional solvent) and more conductive additives in the second or other stage and (iii) (optionally) add more solvent in the final stage (e.g., in order to reduce viscosity and make the slurry easier to process). In some designs, it may be advantageous to have substantially (e.g., by about 2-10,000 times) higher viscosity of the mix in the first stage (or at least one of the initial stages) than in the subsequent (or the final) slurry mix. In some designs, regulating the viscosity in this manner may result in improved performance due to the achievement of a higher effective shear rate needed to break up any agglomerates and more uniformly distributed slurry ingredients.

In some designs, it may be advantageous to have a substantially (e.g., by about 1.2-100 times) higher fraction of solids in the first stage (or at least one of the initial stages) of the mixing than in the subsequent (or the final) slurry mix. Such procedures may lead to improved performance, which may be related to better slurry dispersion.

In some designs, when more than one binder is used, it may be advantageous to add binders (or binder suspension(s) or solution(s)) in several stages during the electrode slurry mixing. In one illustrative example, it may be advantageous to (i) mix all or some conductive additives (or conductive additive suspension in a solvent) and a first binder (or first binder solution or first binder suspension) in a first stage, (ii) add active (nano)composite materials (and optionally more conductive additives) in a second stage or other stage, (iii) add the second binder (or second binder solution or second binder suspension) and possibly additional conductive additives (or suspension of conductive additives) in the third or other subsequent stage, (iv) (optionally) add more solvent in the fourth or other subsequent stage. In some designs, when gradual (or step-wise) binder addition is utilized, it may be important that binder(s) do not adsorb onto electrode particles or conductive additives (from a binder solution or slurry) during slurry mixing to the level when they link particles together and form aggregates during the slurry mixing stage. At the same time, in some designs (for example, when more than one binder is used and when one binder may preferably be located at the surface of electrode particles or when one binder may help one to achieve more uniform dispersion of particles in a solution, acting similar to a surfactant), it may be advantageous to achieve at least partial (e.g., about 20-100%) surface adsorption of one binder during the slurry mixing stage. However, in some designs, it may be desired to configure the slurry composition, surface chemistry of the electrode particles and conductive additives, slurry solvent and mixing protocols in such a way as to reduce or avoid formation of agglomerates during the slurry mixing (while preferably achieving improved mixing).

In some designs, it may also be further advantageous to use different types of conductive additives in different stages (particularly in aqueous slurries). In some designs, it may be advantageous to mix conductive additives (for example, 1D additives or a mixture of 1D additives and near-spherical nanoparticles, such as carbon black nanoparticles) in a solution before adding the binder (or binder solution or suspension) or the active (nano)composite materials (particularly in aqueous slurries). In some designs, it may be further advantageous to use surfactant(s) during the conductive additives (for example, 1D additives or a mixture of 1D additives and near-spherical nanoparticles, such as carbon black nanoparticles) mixing or dispersing in a solution. In some designs, it may be further advantageous to functionalize the surface of conductive additives with functional groups or small molecules or polymers to improve (or to better control) their dispersion (distribution) in a slurry (during the electrode slurry mixing) and the final (casted) electrode.

In some designs, it may be advantageous to have some (or all) the binder and some (or all) conductive additives premixed before adding active (nano)composite materials into a slurry.

In some designs, it may be advantageous to add binder (or binder solution or suspension) in several stages during the electrode slurry mixing. In some designs, it may also be further advantageous to use different types of binders in different stages.

In some designs, it may be advantageous to have active material, some (or all) the binder and some (or all) conductive additives premixed and dried (e.g., to form a powder, including granulated powder) before adding a solvent or solvent mixture (and optionally some additional conductive additives and/or optionally some additional binder) into a slurry. In this case, improved uniformity or performance or smaller performance variation may be attained in cell designs.

In some designs, it may be further advantageous to add a solvent (e.g., water) in several stages during the electrode slurry mixing. In some designs, it may also be further advantageous to use different types of solvents (e.g., water and an alcohol or water and alcohol-containing water) in different mixing stages.

In some designs, it may be advantageous for the aqueous (water-based) slurries to additionally comprise an alcohol (e.g., ethanol, methanol, isopropanol, etc.) in the amount from around 2 vol. % to around 20 vol. % (relative to the total water-alcohol volume mixture) in order to achieve a high performing electrode coating (e.g., with a reduced content of defects, with higher degree of uniformity, with a more favorable distribution of conductive additives, etc.).

In some designs, it may be particularly advantageous to arrange a conductive interlayer between the electrode with at least moderate volume changing particles (such as those comprising Si and carbon, among others) and the current collector foil (such as Cu or Ni or stainless steel or Ti or another suitable metal or alloy metal foil, including but not limited to electrodeposited or rolled or layered or porous or fiber-comprising foils, in case of a Si-comprising anode). For example, not only such a conductive interlayer may enhance rate performance of the electrode with volume-changing (nano)composite electrode particles, but most importantly it may significantly enhance electrode mechanical stability and adhesion to the current collector (e.g., by reducing stress concentration near this area). In some designs, such an interlayer may also protect a metal current collector foil from undesirable reactions with electrolyte. In some designs, such an interlayer may become particularly advantageous for electrodes comprising (nano)composite particles exhibiting larger volume changes (particularly those that comprise Si). In some designs, such an interlayer may further be particularly advantageous for such electrodes produced at medium-to-high capacity loading (e.g., about 3-12 mAh/cm$^2$). In some designs, such an interlayer may also be particularly advantageous for relatively thin current collector foils (e.g., foils with an average thickness from around 4 μm to around 15 μm). In some designs, the use of both higher capacity loadings and thinner foils may be advantageous because such design approaches maximize energy density of the cells.

The volume changes in the electrode (at both the first cycle and subsequent cycling) may induce significant stresses within the foils, which may eventually lead to its mechanical failure. Similarly, such volume changes may also lead to separation of at least portions of the electrodes from the current collector foils. Unfortunately, higher capacity loadings may induce larger stresses at both the electrode/foil interface and, in some cases, within the foil and, thus, lead to mechanical failure(s). If such stresses exceed some critical value related to the electrode/foil adhesion strength, the electrode may delaminate from the foil after a certain number of charge-discharge cycles. In some designs, the use of a conductive interlayer may significantly reduce stress concentration and additionally improve electrode adhesion. Therefore, in some designs, the conductive interlayer may effectively reduce or prevent the delamination and improve cell cycle stability to acceptable values. In some designs, the strain and stresses within the electrode may effectively translate into the (cycling) strain and stresses within the current collector foils. In some designs, thinner foils may not exhibit sufficiently high strength, sufficiently high maximum strain or sufficiently good fatigue resistance and, thus, form cracks and fractures during cycling, leading to premature cell failure. In some designs, the use of a conductive interlayer between the electrode and current collector foils may absorb some of the stresses, thereby reducing stresses within the foil and effectively prevent (or significantly delay to an acceptable value) foil failure.

In some designs, this conductive interlayer (which may alternatively be called "a buffer layer") may be deposited on the surface of the current collector prior to electrode slurry coatings (or, more generally, prior to electrode coating deposition since the electrode coatings may also be deposited dry). In some designs, this interlayer (buffer layer) may be deposited on the metal current collector (e.g., metal current collector foils) by tape casting (slurry casting) or by spraying or by electrophoretic deposition or by electrostatic deposition (electrostatic painting) or by other suitable techniques or their various combinations.

In some designs, such an interlayer may comprise solid particles, polymeric binder and pores. In some designs, the polymeric binder may be electrically conductive or electrically insulative. In some designs, mechanical properties of the interlayer may be optimized for a particular electrode design. In some designs, a suitable fraction of electronically conductive materials within the interlayer may range from around 0.05 wt. % to around 100 wt. % (in some designs, from around 1 wt. % to around 30 wt. %). In some designs, the interlayer may be configured so as to remain electrically conductive even when a small fraction of conductive materials is utilized (e.g., so that electrical percolation of conductive particles is achieved within the interlayer).

In some designs, solid particles in the interlayer may exhibit a near-spherical or elliptical shape, irregular shape, be planar (two dimensional, 2D) or be elongated (one dimensional, 1D). In some designs, the average smallest dimension of the solid particles (diameter or thickness) may range from around 0.3 nm to around 5 microns (in some designs, from around 1 nm to around 300 nm). In the case of 1D and 2D solid particles, the average largest dimension of the solid particles (average length of the (nano)fibers, (nano)wires, (nano)tubes, or average diameter of planar particles) may range from around 10 nm to around 5,000 μm (e.g., more preferably from around 500 nm to around 30 μm). In some designs, planar or elongated (2D or 1D) particles with larger length may be challenging to coat/deposit on a foil.

In some designs, the use of mechanically strong 2D and 1D nanomaterials within this interlayer improves its mechanical properties and thus may be particularly effective for cell stability improvements. In some designs, 1D materials may additionally provide simplicity for the interlayer fabrication because they may be easier to disperse or intermix with other components of the interlayer. In some designs, a suitable fraction of such 1D nanomaterials in the interlayer may depend on the particular electrode design and may range from around 0 wt. % to around 100 wt. %. Suitable examples of 1D materials include, but are not limited to single walled carbon nanotubes (SWCNTs), double-walled carbon nanotubes (DWCNTs), multi-walled carbon nanotubes (MWCNTs), carbon (nano)fibers, graphite ribbons, suitable (compatible with the electrode) metal (nano)wires, (nano)tubes and (nano)fibers (for example, copper, iron, nickel, or titanium or their alloys for Li ion battery anodes; aluminum or nickel for Li-ion battery cathodes), suitable (compatible with the electrode) ceramic nanowires or nanofibers (for example, nanowire or nanotube or nanofibers comprising aluminum oxide, zirconium oxide, magnesium oxide, and other oxides; titanium nitride, boron nitride, various other nitrides; various other suitable ceramic materials), suitable polymer or organic (nano)fibers, various structural composite and core-shell (nano)fibers, (nano)wires and nanotubes, etc. In some designs, these 1D materials may be conductive or may be insulative. In some designs, higher electrical conductivity may be advantageous for achieving higher power performance and better electrical connectivity between the electrode and the current collector foil. In some designs, it may be advantageous for at least one type of the solid particles to exhibit a 1D shape.

In some designs, it may be particularly advantageous for the interlayer to comprise a polymer binder that comprises the same functional groups as the binder used in the electrode formulation. In some designs, it may be advantageous for the interlayer to comprise a polymer binder with the same (or similar, within about 10-20%) degree of hydrolysis as the binder used in the electrode formulation. In some designs, it may be advantageous for the interlayer to comprise the same or similar polymer binder as the one used in the electrode formulation. In some designs, it may be advantageous for both the interlayer and the electrode formulation to comprise SWCNTs or DWCNTs or MWCNTs or their combinations.

Figure 2A:
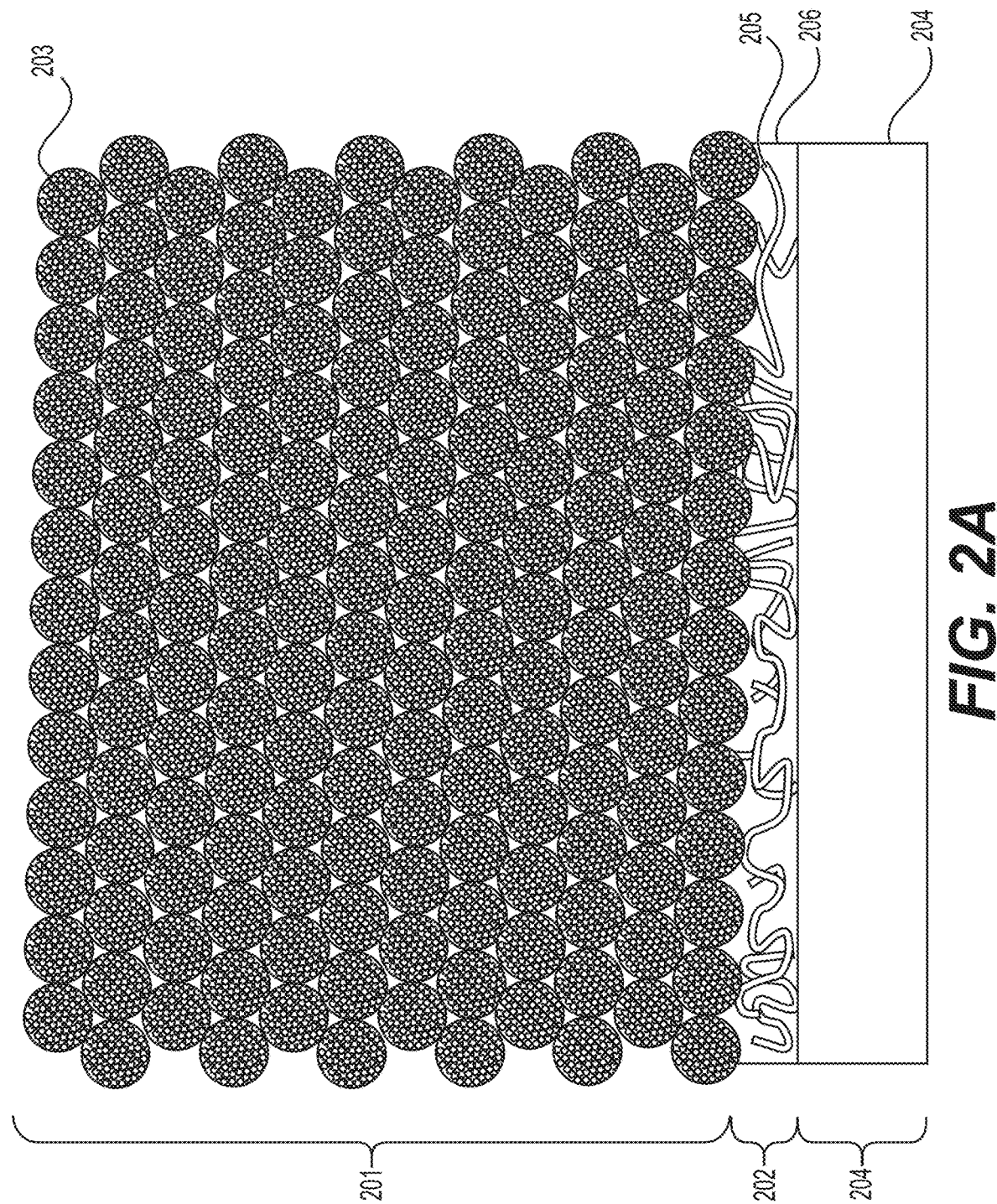
FIGS. 2A and 2B illustrate example (e.g., Li-ion) electrodes, in which the interlayer (or a buffer layer) exists between the composite anode particles and an example Cu current collector.
Figure 2B:
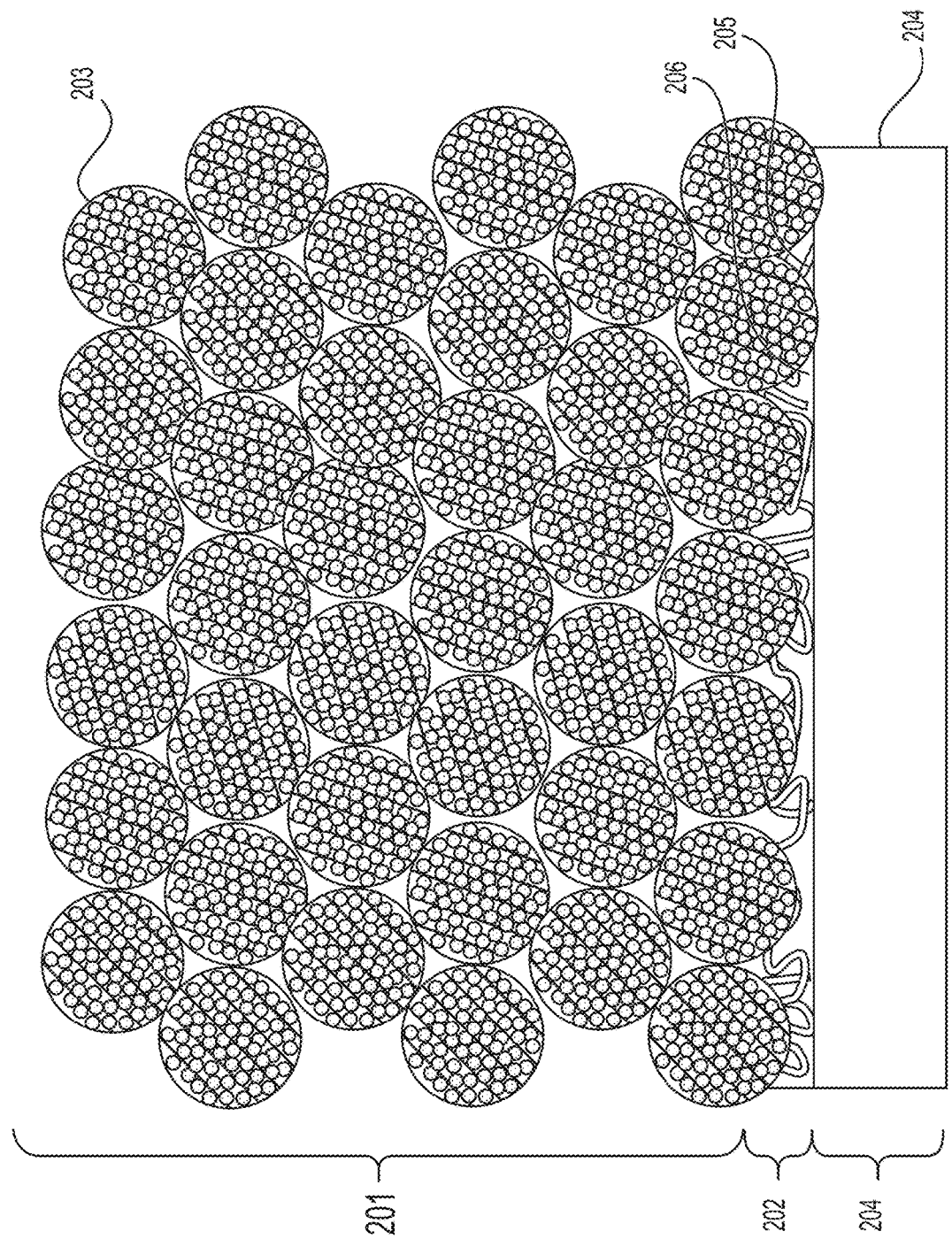

FIG. 2A and FIG. 2B illustrate a schematic example of one side of an electrode 201 comprising (nano)composite particles 203, a current collector 204 and a conductive interlayer 202 in between. The interlayer 202 in this example comprises suitable conductive additives 205 (e.g., carbon black or carbon nanotubes or carbon fibers or nanowires or other suitable conductive additives) and a polymer 206. The interlayer 202 electrically connects the current collector and active (ion storing) portion of the electrode and improves adhesion and mechanical robustness of the electrode (and may also reduce electrode resistance). In FIG. 2A all or nearly all (nano)composite particles 203 do not have a direct contact with a current collector 204 (e.g., the electrical interconnection between the (nano)composite particles 203 and the current collector 204 is instead facilitated via the conductive additives 205 of the conductive interlayer 202). In FIG. 2B some of the (nano)composite particles 203 may have a direct contact with a current collector 204 (e.g., by virtue of a thinner conductive interlayer 202 on at least part of the current collector 204 relative to the conductive interlayer 202 depicted in FIG. 2A).

In some designs, it may be advantageous for the conductive interlayer 202 between the electrode 201 and current collector foils 204 to be composed of several sub-layers of distinct compositions or to exhibit a gradual change in composition. In one example, the type of the binder or the amount of the binder may be different at the interface with the metal foil (or current collector 204) and at the surface or top coating of the conductive interlayer 202. In another example, the type of the conductive additive(s) or the amount of conductive additives may be different at the interface with the metal foil (or current collector 204) and at the surface or top layer of the conductive interlayer 202. In some designs, when more than one sub-layer is used for the conductive interlayer formation, different solvents may be utilized for the deposition of each sub-layer. In some designs, it may be advantageous for the sub-layers to be of different thickness for optimal performance.

In some designs, it may be advantageous to add functional groups (or a substantially thin, e.g., about 1-5 nm in average thickness, layer of an organic component, such as a polymer) onto the surface of metal foil current collectors 204 in order to: (i) improve adhesion of the electrode (or the conductive interlayer 202), (ii) improve electrode slurry wetting (or wetting of the pre-deposited conductive interlayer slurry), or (iii) achieve preferential adsorption of the components of the slurry (or components of the conductive interlayer slurry) at the interface with the metal for improved electrode performance (improved stability, improved rate, etc.). An example of such a functional group is depicted in FIGS. 2A-2B as a portion of the polymer layer 206. In some designs, such functional groups (or a thin polymer layer) may be used to chemically bond the (electrode or interlayer) binder or the conductive additives or the active particles to the current collector foils. In some designs, such functional groups may be added by using solution-based chemistry or by using dry chemistry techniques (such as plasma, ultraviolet (UV)-treatment, ozone treatment, exposure to one or more reactive gases, etc.).

It will be appreciated that, in the forgoing discussion, the "electrode" layer is separately described from the interlayer and the metal foil current collector. However, in some other examples, the electrode may be understood as a combination of all the components, including the foil and the interlayer.

In some designs, a suitable thickness of the interlayer may range from around 1 nm to around 10 µm. In some designs, a suitable thickness of the interlayer may range even more preferably from around 5 nm to around 1 µm (in some designs, from around 10 nm to around 200 nm). In some designs, larger than optimal thickness may reduce the energy density of the cell to an undesirably low level and, in some cases, may increase first cycle losses. On the other hand, in some designs, lower than optimal thickness may be insufficient for providing the desired enhancement in performance. In some designs, an optimal thickness of the interlayer may also depend on the particular electrode and cell designs as well as the interlayer composition and properties.

In some applications, two or more conductive additives in the electrode (or in the interlayer or in both) may be selected to achieve different functions. In one example, one type of additive (e.g., with larger dimensions or higher conductivity) may be selected to provide higher electrical conductivity within the electrode as a whole, while the second type of conductive additive may be selected to ensure that each individual electrode particle is effectively electrically connected to multiple neighboring electrode particles and the first type of additive, thereby forming an efficient conductive network that results in high capacity utilization of the electrode material. In another example, one type of additive may be selected to perform multiple functions (e.g., to enhance both electrical conductivity and mechanical stability of the electrodes or to enhance electrical conductivity of the electrode and provide faster ionic pathways (e.g., if it is porous or if it prevents electrode pore closing)). In another example, one type of conductive additive may also assist in better dispersing the second type during the slurry mixing. In particular, in some designs, it may be advantageous to use a mixture of two of the following types of conductive additives in the same slurry: (i) various types of single walled carbon nanotubes (SWCNTs) (with or without surface coatings); (ii) various types of double-walled and multiwalled carbon nanotubes (MWCNTs) (with or without surface coatings); (iii) various types of carbon black (including those that are annealed at above 1000° C. in an inert environment); (iv) various types of carbon fibers (including those that are annealed at above 1000° C. in an inert environment); (v) various types of carbon nanofibers; (vi) various types of metal nanowires (without or with protective or functional surface coating layers) (e.g., Cu, Fe, Ti, or Ni nanowires for low potential anodes in Li-ion batteries, such as Si comprising anodes; Al nanowires for cathodes or high voltage anodes in Li-ion batteries, or other nanowires (e.g., Ni or Ti nanowires) for various aqueous batteries, etc.); (vii) various types of carbon-coated or metal- (e.g., Cu, Fe, Ni, Ti or Al, etc.) coated ceramic nanowires or fibers (e.g., $Al_2O_3$ nanowires or fibers); (viii) various types of carbon onions; (ix) various types of graphite ribbons (including metal-coated graphite ribbons); (x) various types of metal (e.g., Cu, Fe, Ni, Ti or Al, etc.) nanoparticles (with or without coatings by a protective or functional surface layer); and (xi) various types of metal (e.g., Cu, Fe, Ni, Ti or Al, etc.) (nano)flakes (with or without coatings by a protective or functional surface layer), (xii) conductive metal oxides (e.g., suboxides of titanium oxide) provided these remain electrochemically stable within the electrode operating potential (often more suitable for conversion-type cathodes), to name a few examples. In some designs, the surface chemistry of each type of such additive could be individually optimized for optimum performance in cells.

In some applications, it may be advantageous to restrict the overall volume fraction of all conductive additive particles within the electrode to less than about 5 vol. % (e.g., in some designs, even more preferably below about 2 vol. %). By mass, the fraction of all conductive additive particles within the electrode may preferably be less than about 7 wt. % in some designs (e.g., in some designs, even more preferably below about 3 wt. %) if only carbon materials are used as conductive additives and less than about 10 wt. % (e.g., in some designs, even more preferably below about 5 wt. %) if some of the conductive additives comprise suitable metals or metal oxides. In some designs, a higher volume fraction of conductive additives may reduce ionic transport and volumetric capacity of electrodes and may increase the extent of undesirable side reactions. In some designs, a higher gravimetric (mass) fraction of conductive additives may reduce the specific capacity of the electrodes.

In some designs, the volume fraction of conductive additives in an interlayer may exceed the average volume (or weight) fraction of conductive additives in the bulk of the electrode by two times or more (in some designs by about 2-100 times). For example, if the bulk of the electrode comprises about 0.2 wt. % of conductive additives, the interlayer may comprise from about 0.4 wt. % to about 20.0 wt. % of conductive additives. In some advantageous designs, the volume fraction of conductive additives in such an interlayer may exceed the average volume (or weight) fraction of conductive additives on the top surface of the electrode by two times or more (in some designs by about 2-100 times). One way to discover such differences in carbon additive content within a battery electrode is to separate an electrode from a current collector and image the top surface of the electrode (that used to contact a separator member) and the bottom surface of the electrode (that used to contact a current collector foil) or the current collector. If either the separated bottom surface of the electrode or the current collector comprises significantly (by about 2 times or more) larger fraction of conductive additives, it means that the interlayer was present and comprised significantly larger fraction of conductive additives. Examples of suitable imaging or characterization techniques (that may be capable of detecting such differences in conductive additives) may include, but not limited to, Raman microscopy (Raman mapping), secondary electron microscopy (SEM), energy dispersive x-ray spectroscopy mapping (often called EDS or EDX or EDXA mapping), optical microscopy, X-ray photoelectron spectroscopy (XPS) and related techniques, secondary ion mass spectrometry (SIMS) and related techniques, Auger spectroscopy and related techniques, and other suitable techniques. Another way to discover such differences in carbon additive content within a battery electrode is to separate an electrode from a current collector and image the cross-section of the electrode and the bottom surface of the electrode (that contacted a current collector foil prior to the separation) or the current collector. If either the separated bottom surface of the electrode or the current collector comprises significantly (by about 2 times or more) larger fraction of conductive additives than the cross-section of the electrode, then the presence of an interlayer comprised of a significantly larger fraction of conductive additives is indicated.

In some designs, the volume fraction of polymer binders in such an interlayer may exceed the average volume (or weight) fraction of conductive additives in the bulk of the electrode by two times or more (in some designs by about 2-50 times). For example, if the bulk of the electrode comprises about 8 wt. % of the binder, the interlayer may comprise about 16 wt. % to about 99.0 wt. % of conductive additives. In another example, if the bulk of the electrode comprises about 10 vol. % of the binder (e.g., the rest being occupied by the pores, active material and conductive additives), the interlayer may comprise about 20 vol. % to about 99.0 vol. % of binder (e.g., the rest being occupied by the pores and the conductive additives or the active material, the pores and the conductive additives).

In some advantageous designs, the volume fraction of conductive additives in such an interlayer may exceed the average volume (or weight) fraction of conductive additives on the top surface of the electrode by two times or more (in some designs by about 2-100 times).

Referring to FIGS. 2A-2B, in some designs, an Li-ion electrode may comprise a current collector (e.g., current collector 204), a conductive interlayer (e.g., the interlayer 202) arranged on the current collector, and an electrode active material layer (e.g., the electrode 201) arranged on the conductive interlayer. In some designs, the conductive interlayer may comprise first conductive additives (e.g., conductive additives 205) and a first polymer binder (e.g., polymer 206). In some designs, the electrode active material layer comprises a plurality of active material particles (e.g., (nano) composite particles 203) mixed with a second polymer binder and second conductive additives, the plurality of active material particles exhibiting an average particle size in the range from about 0.2 microns to about 10 microns, an average volume expansion in the range of about 8 vol. % to about 180 vol. % during one or more charge-discharge cycles of the Li-ion battery cell, and an average areal capacity loading in the range of about 3 mAh/cm$^2$ to about 12 mAh/cm$^2$.

In some designs, the first polymer binder comprises at least one component of the second polymer binder. However, in other designs, the first and second polymer binders may be different in composition. In some designs, the first and second polymer binders may also different in terms of concentration irrespective of whether the first and second polymer binders are the same or different in terms of composition.

In some designs, the first conductive additives comprise at least one component of the second conductive additives. However, in other designs, the first and second conductive additives may be different in composition. In some designs, the first and second conductive additives may also different in terms of concentration irrespective of whether the first and second conductive additives are the same or different in terms of composition.

In some designs, the first conductive additives comprise at least one component of the second conductive additives. However, in other designs, the first and second conductive additives may be different in composition. In some designs, the first and second conductive additives may also different in terms of concentration irrespective of whether the first and second conductive additives are the same or different in terms of composition.

In some designs, the plurality of active material particles comprise Si. In some designs, the electrode active material layer comprises water-soluble or water-dispersible binders. The water-soluble or water-dispersible binders may be part of (e.g., at least one component of) the second polymer binder, or alternatively may be separate from the second polymer binder. In an example, the second polymer binder may comprise at least one component that is water soluble and at least one component that is water-dispersible. In some designs, the electrode active material layer comprises a plurality of binder components (e.g., the second polymer binder and at least one other binder component, or multiple polymer binder components). In some designs, at least one of the plurality of binder components comprises particles or (nano)fibers or (nano)ribbons of an elastomeric material with a maximum elongation (or maximum strain) in the range from about 50% to about 5,000%. In some designs, the particles or fibers of the elastomeric material comprise around 60 to 95 wt. % of all binder in the electrode active material layer. In some designs, a smallest average dimension of the particles or fibers of the elastomeric material (diameter for spherical particles or fiber-shaped particles) ranges from around 30 nm to around 600 nm. In some designs, particles of elastomeric materials may exhibit two or more distinct sizes or a broad particle size distribution with a coefficient of variation larger than around two.

In some designs, the second conductive additives comprise single walled, double-walled and/or multi-walled carbon nanotubes. In some designs, a weight fraction of all carbon nanotubes of the second conductive additives ranges from around 0.05 wt. % to around 5 wt. % of the electrode active material layer. In some designs, the first conductive additives single walled, double-walled and/or multi-walled carbon nanotubes. In some designs, a weight fraction of all carbon nanotubes of the first conductive additives ranges from around 0.1 wt. % to around 20 wt. %. In some designs, a first weight fraction of the first conductive additives in the conductive interlayer exceeds a second weight fraction of the second conductive additives in the electrode active material layer by at least about 2 times.

In some designs, as will be described in more detail with respect to FIGS. 4A-6 below in more detail, upon separation of the current collector from the conductive interlayer, Raman spectroscopy mapping detects at least about 2 times more conductive additives on an exposed surface of the separated current collector or an exposed surface of the separated conductive interlayer than a top surface of the electrode active material layer. In some designs, an average thickness of the conductive interlayer ranges from around 25 nm to around 500 nm. In some designs, a Li-ion battery electrode as described above may be incorporated into a Li-ion battery.

FIG. 3 shows SEM images of the top (left) and the bottom (right) of a high capacity anode 301 comprising near-spherical volume-changing Si-containing (nano)composite particles 303 and initially comprising a conductive interlayer (in turn, comprising a polymer binder—conductive carbon nanotube mix) between the electrode layer and the copper current collector foil. In particular, FIG. 3 illustrates a significant difference in the amount of binder mixed with conductive additives 302 clearly visible between the two images: e.g., on the left side of FIG. 3, hardly any binder-rich regions could be clearly distinguished at the top of the electrode 301, while on the right side of FIG. 3, nearly half of the bottom of the electrode 301 (e.g., positioned near the current collector foil before the foil was detached from the electrode) comprises binder-rich regions.

Note that in some designs when spherical or near-spherical active (nano)composite particles are used, it may be advantageous for at least a portion (e.g., from around 0.1 wt. % to around 20 wt. % or from around 0.1 vol. % to around 20 vol. %) of such spherical particles to be broken into smaller fractions of the initial spheres in order to attain higher electrode density or higher electrode stability. In some designs, at least a portion of such particle breakage may take place during particle synthesis and before electrode casting. In some designs, at least a portion of such particle breakage may take place during slurry mixing. In some designs, at least a portion of such particle breakage may take place during electrode densification (e.g., by pressure calendaring).

Figure 4A:
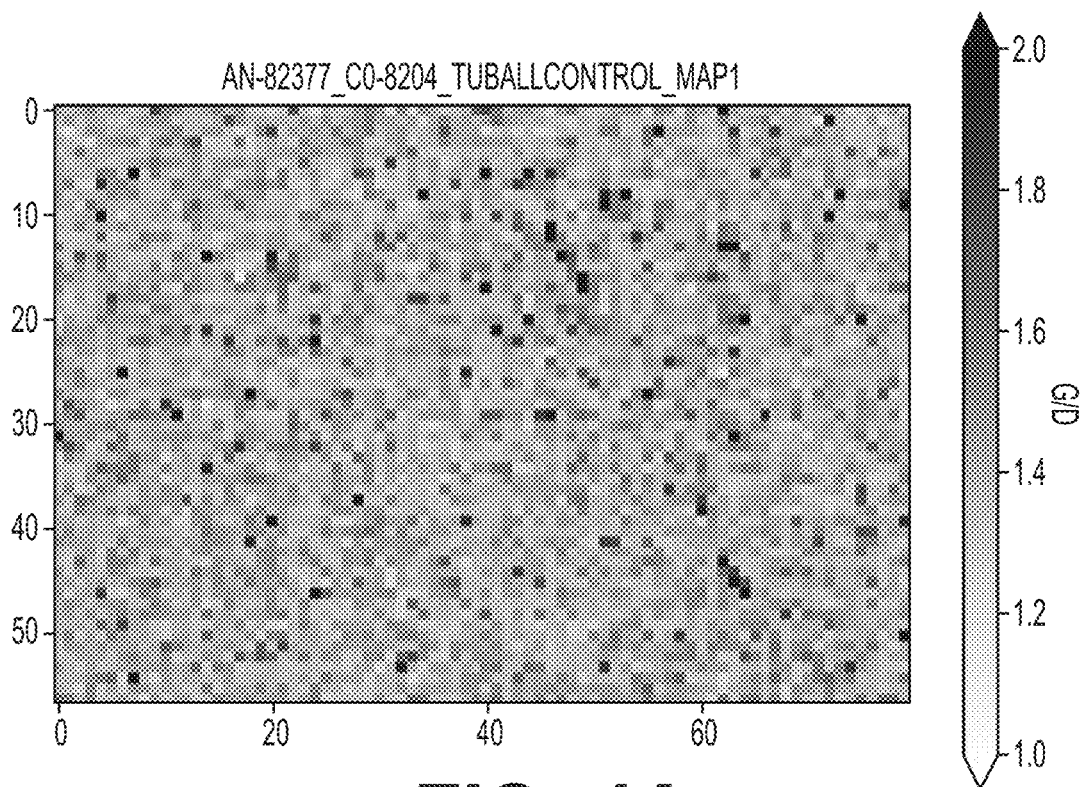
FIGS. 4A and 4B illustrate Raman mappings of the top of the electrode surface and that of the current collector copper foil separated from the bottom of the electrode, showing a significantly higher fraction of carbon nanotubes on the copper foil left from the interlayer, in accordance with embodiments of the present disclosure.
Figure 4B:
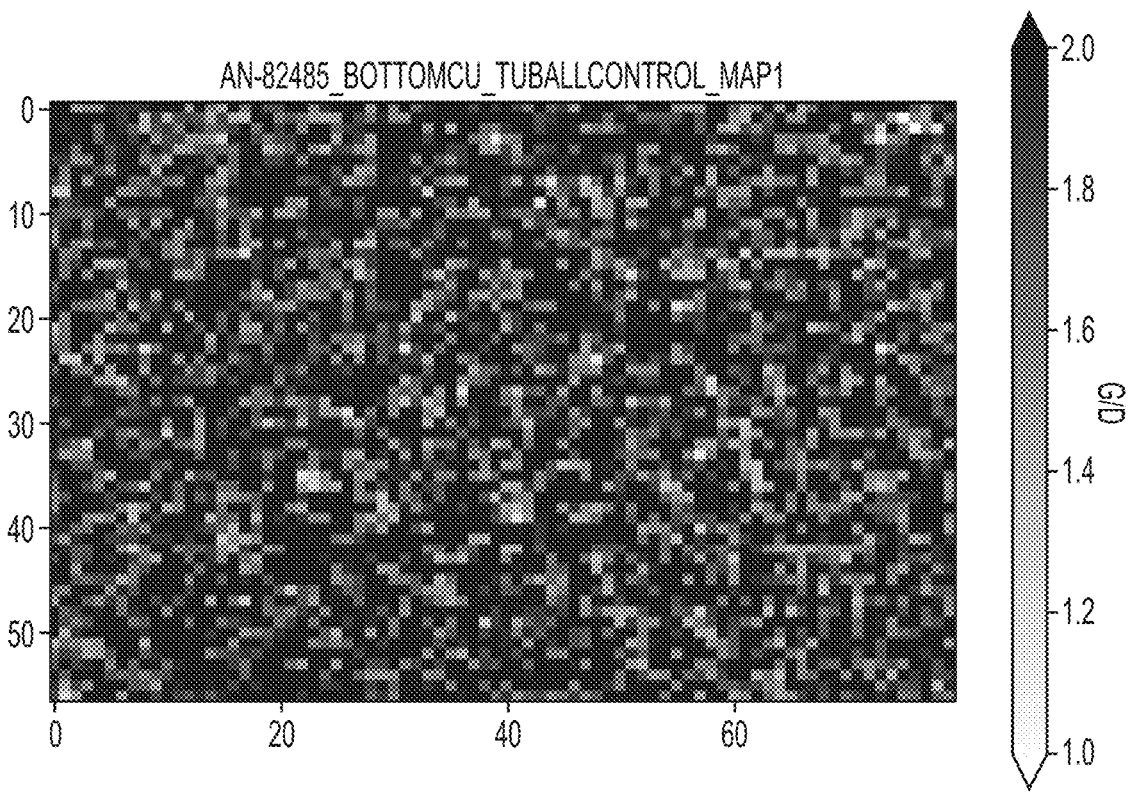

FIG. 4A illustrates Raman mappings of the G/D band ratio at a top surface of a high capacity anode (e.g., such as the electrode 301 of FIG. 3) comprising volume-changing Si-containing (nano)composite particles, SWCNTs (as conductive additives, e.g., at about 0.13 wt. % relative to all solids in the anode), other conductive carbon and a polymer binder. FIG. 4B illustrates Raman mappings of the G/D band ratio at a surface of a copper current collector foil separated from the anode (e.g., the electrode 301 of FIG. 3). SWCNTs exhibit a very strong Raman signal and high ratio of the integrated intensities of so-called G band (typically centered around 1580 $cm^{-1}$) and so-called D band (typically centered around 1360 $cm^{-1}$), as known in the state of the art. By plotting a map of either the G/D ratio or just an intensity of the G band one may visualize the relative difference in the SWCNT distribution on various surfaces because the absence or small amount of SWCNTs gives very weak (or no) signal of the G band. These Raman mappings in FIGS. 4A-4B show that the top of the anode (FIG. 4A) comprises a dramatically smaller fraction of SWCNTs (or SWCNT agglomerates) compared to the Cu foil separated from the bottom of the electrodes (FIG. 4B), thus indicating the presence of the SWCNT-comprising interlayer between the Cu current collector foil and the anode prior to their separation.

FIGS. 5A-5D illustrate Raman mappings of the G/D ratios collected from the top of 4 different anodes comprising the volume-changing Si-containing (nano)composite particles, different amounts of SWCNTs (as conductive additives), other conductive carbon and a polymer binder. In particular, FIG. 5A depicts a Raman mapping for an anode with an SWCNT content in the bulk of the electrode at about 0.13 wt. %, FIG. 5B depicts a Raman mapping for an anode with an SWCNT content in the bulk of the electrode at about 0.27 wt. %, FIG. 5C depicts a Raman mapping for an anode with an SWCNT content in the bulk of the electrode at about 0.40 wt. %, and FIG. 5D depicts a Raman mapping for an anode with an SWCNT content in the bulk of the electrode at about 0.54 wt. %. As shown with respect to FIGS. 5A-5D, an increase in the surface fraction of the map with high G/D ratio correlates well with higher fraction of SWCNTs in the bulk of the electrode.

FIG. 6 illustrates several Raman spectra taken from different areas of an example carbon nanotube-comprising interlayer (buffer layer), comprising SWCNTs in accordance with an embodiment of the present disclosure. As shown in FIG. 6, there is a significant difference in the intensities of D and G bands in all spectra (G band is much stronger).

In some designs, the interlayer may be deposited on the current collector from a slurry.

Figure 7:
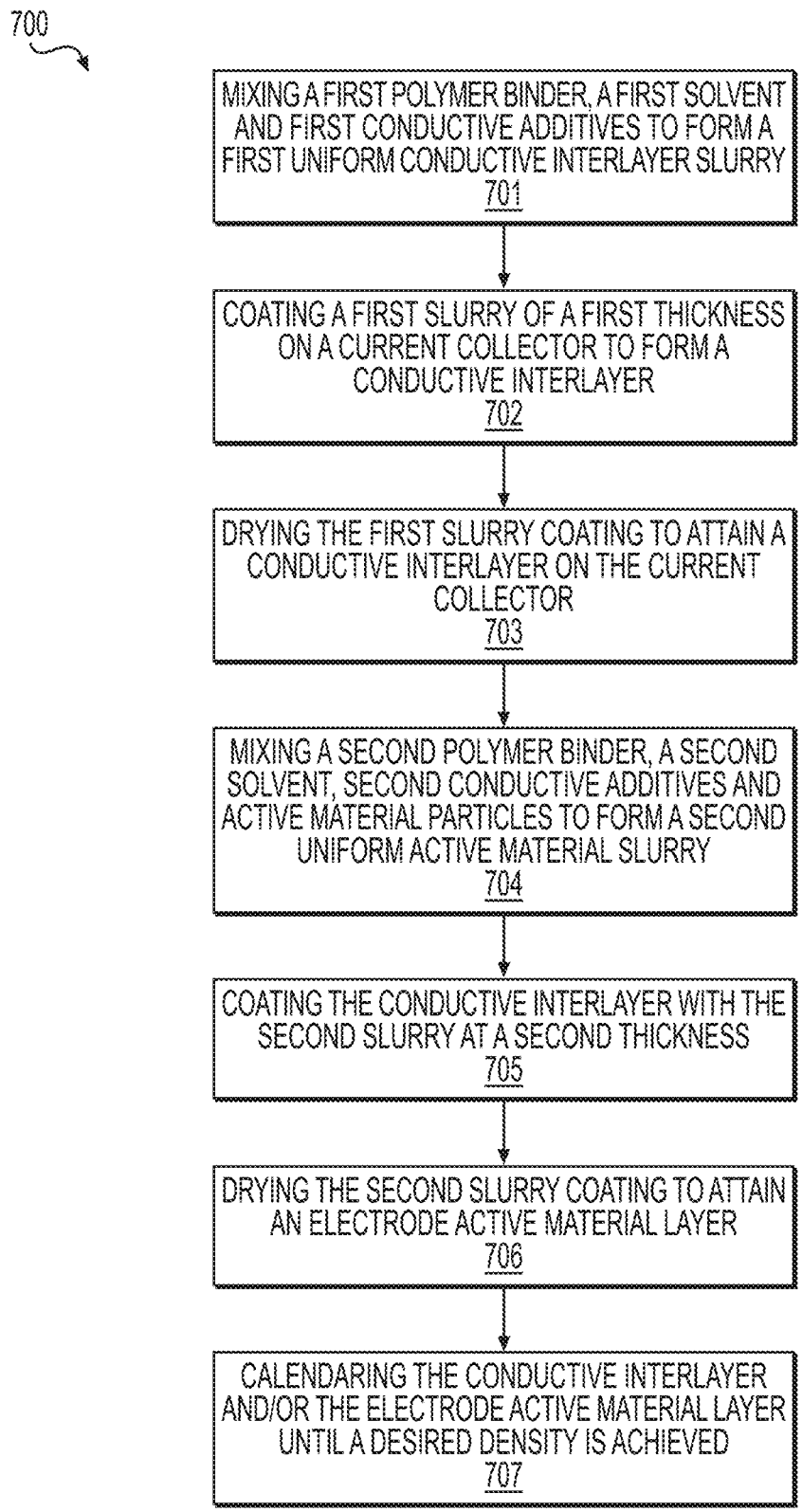
FIG. 7 illustrates a process of Li-ion electrode fabrication in accordance with an embodiment of the disclosure.

FIG. 7 illustrates a process 700 of Li-ion electrode fabrication in accordance with an embodiment of the disclosure. For example, one or more of the electrodes described above (e.g., such as the electrode described with respect to FIGS. 2A-2B, etc.) may be produced in accordance with the process 700 of FIG. 7.

Referring to FIG. 7, at 701, a first polymer binder, a first solvent and first conductive additives are mixed to form a first uniform conductive interlayer slurry. At 702, a current collector is coated with the first slurry at a first thickness to form a conductive interlayer. At 703, the first slurry coating is dried to attain a conductive interlayer on the current collector. At 704, a second polymer binder, a second solvent, second conductive additives and active material particles (for example, (nano)composite particles, which may comprise Si, among others) are mixed to form a second uniform active material slurry. At 705, the conductive interlayer is coated with the second slurry at a second thickness. At 706, the second slurry coating is dried to attain an electrode active material layer. At 707, the conductive interlayer and/or the electrode active material layer are calendared until a desired density is achieved.

Referring to FIG. 7, in some designs, alternative to depositing the wet coating (702) and drying it (703) to form an interlayer, dry coating methods could be utilized (e.g. by electrostatic coatings or other techniques). In such case, stage 701 would include mixing first polymer binder and first conductive additives (without a solvent). Similarly, in some designs, alternative to depositing the wet coating (705) and drying it (706) to form electrode active material layer, dry coating methods could be utilized (e.g. by electrostatic coatings or other techniques). In such case, stage 704 would include mixing a second polymer binder, second conductive additives and active material particles (without a solvent).

Referring to FIG. 7, in some designs, the coating (702) and the drying (703) of the first slurry may repeat a plurality of times (e.g., so as to produce multiple conductive interlayer sub-layers which may be the same or different in terms of composition) to attain the conductive interlayer. Further, in some designs, the coating (705) and the drying (706) of the second slurry may repeat a plurality of times (e.g., so as to produce multiple electrode active material sub-layers which may be the same or different in terms of composition) to attain the electrode active material layer.

Figure 8:
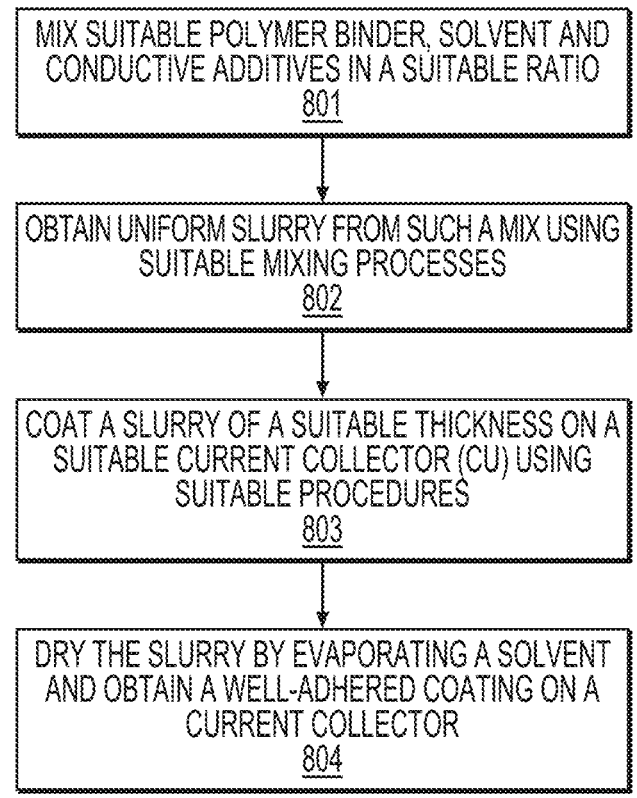
FIGS. 8-10 illustrate example processes, in which the interlayer (or a buffer layer) is produced between the electrode coating and the surface of the current collector foil in accordance with embodiments of the present disclosure.
Figure 9:
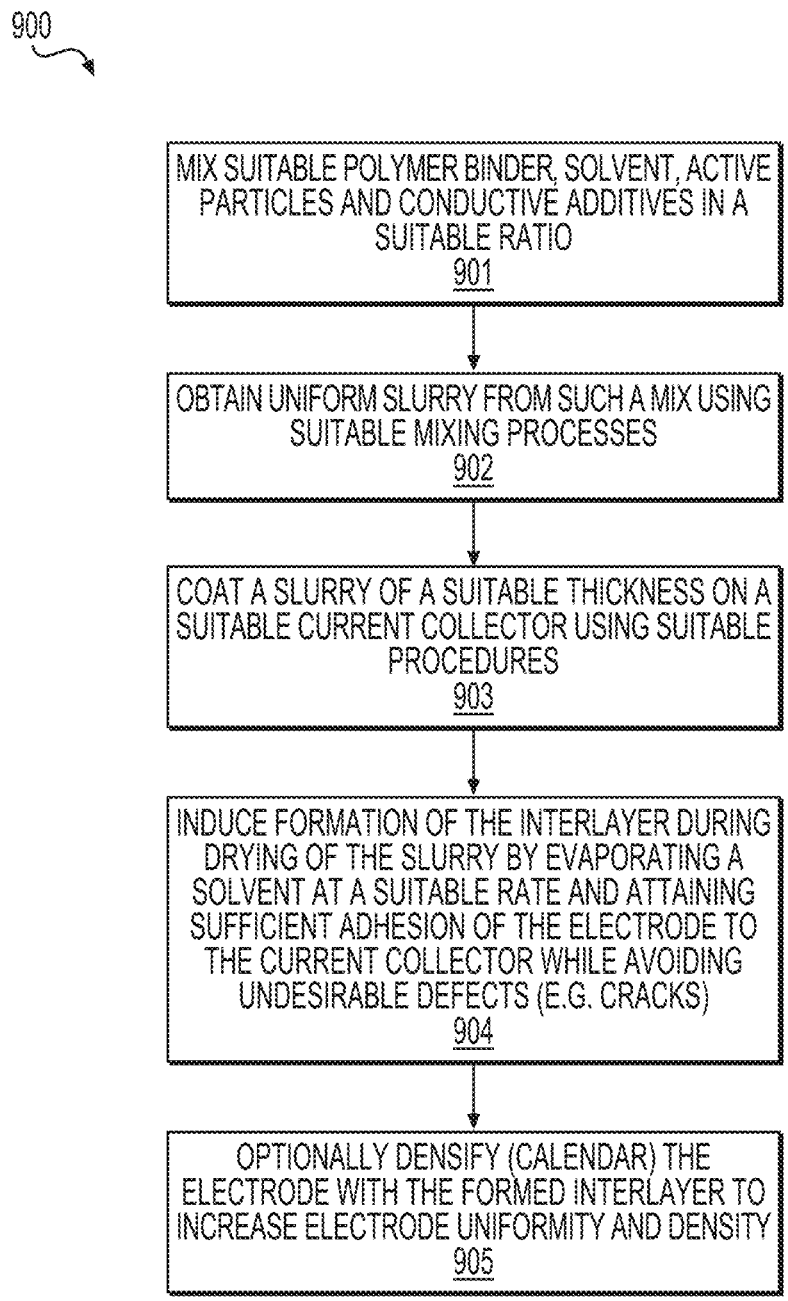
Figure 10:
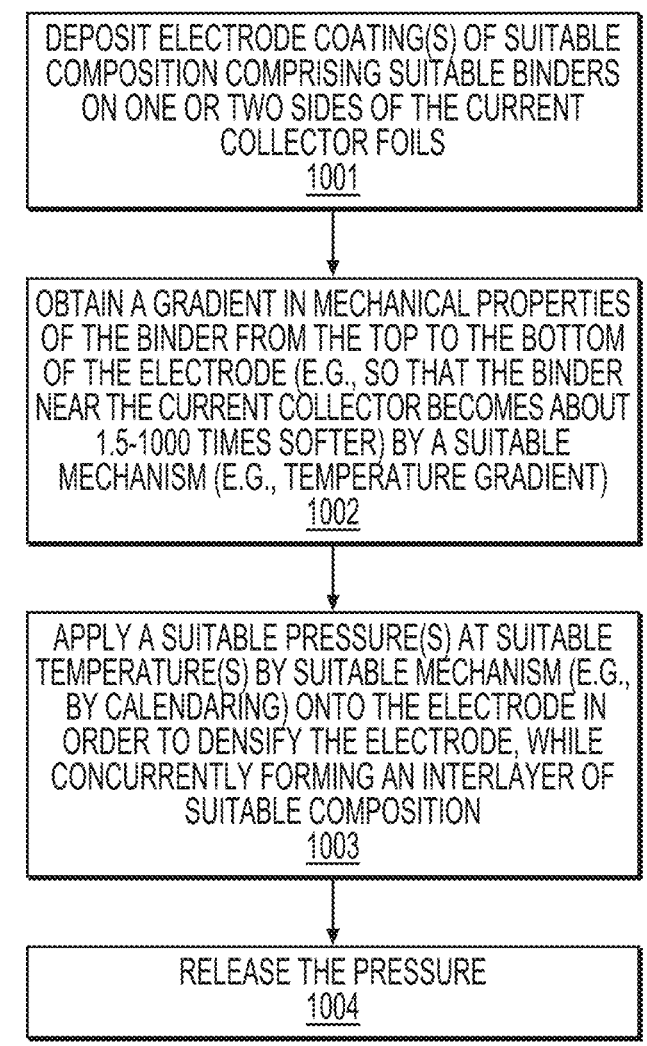

FIGS. 8-10 collectively illustrate one example implementation of the process 700 of FIG. 7.

FIG. 8 illustrates a process of interlayer fabrication in accordance with an embodiment of the disclosure. At 801, a polymer binder, a solvent, and conductive additives are mixed at a given ratio. At 802, the mixing of 801 eventually results in a uniform slurry being obtained. At 803, the uniform slurry is then applied to (or deposited as one or more coatings on) the current collector (e.g., a metal (e.g., Cu) foil). For example, the uniform slurry may be tape cast, sprayed onto the current collector, electro-sprayed onto the current collector, or alternatively may be applied via electrophoretic deposition, until the cast slurry reaches a desired average thickness. At 804, the deposited coating(s) are then dried to remove the solvent and provide sufficient adhesion to the current collector. In some designs, the interlayer may be deposited by a dry coating technique (without solvents), such as electrostatic coatings (e.g., electrostatic painting), among others. In this case, the solvent being added to the mixture at 801 can be omitted, and likewise the evaporation stage at 804 can be omitted.

Referring to FIG. 8, in some designs, the slurry for the interlayer formulation may comprise about 0.5-20 wt. % solids and about 80-99.5% solvent. In some designs, a solvent for the slurry may be water or be water miscible. In some designs, the density of the solvent may range from around 0.9 to around 1.15 g·cm$^{-3}$. In some designs, the melting point of the solvent may range from around −50° C. to around +10° C. In some designs, a solvent for the slurry may be N-methyl-2-pyrrolidone (NMP). In some designs, the solids may comprise one or more polymer binder and one or more conductive carbon additive. In some designs, the polymer binder(s) comprise about 70 to about 99.95 wt. % of the solids. In some designs, the polymer binder is water soluble. In some designs, the molecular weight of such a polymer binder may range from around 10,000 to around 2,500,000 g·mol$^{-1}$. In some designs, the density of such a polymer may range from around 1.1 to around 1.7 g·cm$^{-3}$. In some designs, the melting point of such a polymer may preferably range from around 100° C. to around 300° C. In some designs, the slurry for the interlayer formulation may also comprise a surfactant/dispersant. In some designs, the surfactant/dispersant may contribute from around 0.001 wt. % to around 20.000 wt. % of all the solids in the slurry. In some designs, the wt. fraction of the surfactant may advantageously range from around 0.1 wt. % to around 9 wt. %. In some designs, another (polar) polymer may serve as a surfactant/dispersant. In some designs, the molecular weight of such a polymer may range from around 500 to around 2,500,000 g·mol$^{-1}$. In some designs, the density of such a polymer may range from around 0.9 to around 1.4 g·cm$^{-1}$. In some designs, the melting point of such a polymer may preferably range from around 100° C. to around 300° C. In some designs, such a dispersant polymer may be polyvinylpyrrolidone (PVP). In some designs, the conductive additives in the slurry may comprise carbon nanotubes (such as SWCNTs, DWCNTs, MWCNTs or their combination). In some designs, the conductive additives may contribute to range of about 0.1 wt. % to about 30 wt. % of all the solids in the slurry. In some designs (e.g., when SWCNTs are used), the conductive additives may contribute to range of 0.15% to 5 wt. % of all the solids in the slurry. In some designs, a viscosity of the slurry may preferably range from around 10 to around 30,000 cp (in some designs, from around 500 to around 3000 cp). In some designs, during mixing the slurry from individual components at 301, a power of the mixing may be in the range from around 0.1 kW/L to around 30 kW/L may be applied.

In one example (for exemplary illustrative purpose), the slurry exhibits the following composition: around 3 wt. % solids in NMP solvent. In this example, the solids comprise around 92 wt. % PVA, around 6 wt. % PVP and around 2 wt. % SWCNT composition (e.g., note SWCNT composition may comprise some amount of amorphous carbon or DWCNTs or MWCNTs, but typically no more than about 75 wt. %). In this example, the viscosity of the slurry may be in the range from around 700 to 2,000 cp at room temperature (depending on the shear rate). In case of using a small batch and a centrifugal mixer, the mixing speed in this example is about 2,000 RPM (although the optimal speed may vary from application to application). In this example, a mixing time ranges from around 0.5 to around 20 minutes (e.g., preferably, from around 5 to around 10 minutes). In case of using an overhead mixer, in some designs, a mixing time may range from around 0.5 minute to around 180 minutes (e.g., preferably, from around 5 to around 60 minutes). In case of using an overhead mixer with a planetary blade, in some designs, the mixing speed may range from around 2 to around 1000 RPM (e.g., preferably, from around 20 to around 100 RPM). In case of using an overhead mixer with a high-shear blade, in some designs, the tip speed may range from around 50 to around 5,000 m/s (e.g., preferably, from around 200 to around 500 m/s) and (in some designs, for example with blade size in the range from around 20 to around 40 mm) the mixing speed may range from around 2 to around 1000 RPM (e.g., preferably, from around 20 to around 100 RPM).

Referring to FIG. 8, once a uniform slurry is prepared at 802, the uniform slurry may be coated on a metal current collector (such as a Cu foil) at 803 using a draw-down coater or a spray deposition or another suitable technique. In case of a draw-down coater, a Gavure-type coater may be advantageously used in some designs. In some designs, the coating speed may range from 0.01 m/s to around 10 m/s (e.g., preferably, from around 0.03 to around 0.1 m/s). In one illustrative example, the coating speed is about 0.038 m/s. In some designs, the as-deposited (wet) coating thickness may range from around 0.5 to around 50 micron (e.g., preferably, from around 2 to around 20 micron). In one illustrative example, the coating thickness (gap in a small draw-down coater) is about 13 micron. In some designs, after drying the coating at 804, a thickness of the dried coating may range from around 0.02 micron to around 5 micron (e.g., preferably, from around 0.05 to around 1 micron).

In some designs, an interlayer may be formed during or after the coating (or slurry) deposition on the (e.g., metal) current collector (such as a Cu foil, in some designs). In some designs, the slurry may exhibit sufficient mobility of the binder or conductive additive or both that during drying a larger portion of the binder (or binder/conductive additive mix) is deposited on the surface of the metal current collector compared to the binder or conductive additive deposition on the surface of active (nanocomposite) particles. This may take place, in some examples, due to stronger affinity of the binder to the current collector surface or, in some examples, due to the more stable suspension of the active particles in a slurry compared to that of the binder or conductive additives or, in some examples, due to the application of the electric field and the resulting electrophoretic forces or due to other mechanisms. The precise conditions of the slurry processing may be fine-tuned or optimized (which may include, for example, adjusting the slurry viscosity, adjusting the charges on the surface of conductive additives, active particles or the binder, adjusting the molecular weight (MW) of the binder, adjusting the size of the active particles and conductive additives, adjusting the dielectric constant of the solvent, adjusting the surface tension of the solvent, adjusting the surface chemistry of the conductive additives and active particles, among others) in order to attain the formation of the interlayer of a desired thickness, composition, porosity and/or other properties.

FIG. 9 illustrates another process of interlayer fabrication in accordance with an embodiment of the disclosure. At 901, a polymer binder, a solvent, active (e.g., nanocomposite) particles and conductive additives of suitable properties are mixed at a given ratio. At 902, the mixing of 901 eventually results in a uniform slurry being obtained. At 903, the uniform slurry is then applied to (e.g., deposited as one or more coatings on) a current collector (e.g., a metal (e.g., Cu in case of Si-comprising anode) foil). For example, the uniform slurry may be tape cast, sprayed onto the current collector, electro-sprayed onto the current collector, or alternatively may be applied via electrophoretic deposition, until the cast slurry reaches a desired average thickness. At 904, the deposited coating(s) are then dried at the suitable temperature and at suitable rate to remove the solvent and facilitate migration of at least a small portion of the binder and conductive additives (e.g., from around 0.001 wt. % to around 5.000 wt. % relative to the total amount of binder or the total amount of conductive additives in the slurry) onto the surface of the current collector. In this case, the interlayer of suitable thickness and properties is formed during drying, providing enough adhesion to the current collector and various performance advantages to the electrode, as previously described. At 905, an optional electrode densification (calendaring) is conducted to increase density of the electrode (and thus volumetric capacity of the electrode), to improve uniformity of the electrode thickness and, in some cases, increase adhesion to the current collector and improve mechanical properties of the electrode.

In some designs, the interlayer may be deposited by a dry coating technique (without solvents), such as electrostatic coatings (electrostatic painting), among others. In some designs, the rest of the electrode coating may be deposited by a dry coating technique, such as electrostatic coatings (electrostatic painting), among others. In some designs, both the interlayer and the rest of the coatings may be deposited by a dry coating technique. In this case, the solvent being added to the mixture at 901 can be omitted, and likewise the evaporation stage at 904 can be omitted.

In some designs, the interlayer may be formed from the (at least partially) dried and deposited coatings during calendaring (densification). In some designs, a gradient in temperature or a remaining solvent content or binder mechanical properties is achieved through the electrode thickness in such a way as to make the binder near the current collector foil more deformable. For example, the bottom of the electrode may be hotter or may comprise a larger fraction of the remaining solvent or may comprise a binder with lower glass transition temperature or lower yield strength, etc. In this case, electrode densification will induce significantly stronger deformation in the electrode binder closer to the current collector, where a relatively soft binder (with conductive additives) would flow, thus forming an interlayer. The hotter temperature of the bottom of the electrode (near the current collector) may be attained, for example, by pre-heating the electrode and using a colder calendaring press (e.g., to maintain the electrode top-layer or electrode surface at a lower relative temperature than the bottom-layer near the current collector). Alternatively, the current collector may be heated in a targeted manner (e.g., by passing electrical current through the current collector) such that the electrode is heated specifically near the current collector.

FIG. 10 illustrates another process of interlayer fabrication in accordance with an embodiment of the disclosure. At 1001, an electrode coating comprising a polymer binder, active (e.g., nanocomposite) particles and conductive additives of suitable properties and compositions is deposited onto one or both sides of a suitable current collector foil by a suitable mechanism. At 1002, a gradient in binder mechanical properties is attained by a suitable mechanism (e.g., stronger heating the electrode near the current collector, cooling the electrode surface, introducing larger amount of binder-swelling solvent in the top portion of the electrode, etc.) so that the binder near the top of the electrode remains more rigid than the binder near the bottom of the electrode (near a metal current collector) and so that the binder near the current collector becomes relatively softer (e.g., hardness lower by 1.5-1000 times) and more deformable. At 1003, a pressure is applied to the electrode by suitable means (e.g. calendaring or pressure rolling) inducing a stronger deformation in the electrode near the current collector foils, thus forming an interlayer. At 1004, the pressure is released. In some designs where the pressure at 1004 is applied via calendaring, the calendaring may be applied concurrently to electrode coatings arranged on both sides of the current collectors (e.g., via rollers).

In some designs, the binder in the interlayer (or electrode material layer or both) may comprise a copolymer. In some designs, this copolymer binder may be water-soluble. In some designs, a water-soluble copolymer in the interlayer (or the electrode material layer or both) may comprise at least one of the following components: vinyl (or butyl or methyl or propyl, etc.) acetate, vinyl (or butyl or methyl or propyl, etc.) acrylic, vinyl (or butyl or methyl or propyl, etc.) alcohol, vinyl (or butyl or methyl or propyl, etc.) acetate-acrylic, vinyl (or butyl or methyl or propyl, etc.) acrylate, styrene-acrylic, alginic acid, acrylic acid, vinyl (or butyl or methyl or propyl, etc.) siloxane (or other siloxanes), pyrrolidone, sterene, various sulfonates (e.g., styrene sulfonate, among others), various amines (incl. quaternary amines), various dicyandiamide resins, amide-amine, ethyleneimine, diallyldimethyl ammonium chloride. In some designs, copolymer binders may comprise poly(acrylamide) (that is comprise acrylamide ($-CH_2CHCONH_2-$) subunits). In some designs, such poly(acrylamide)-comprising copolymer binders may be water soluble. In some designs, such poly(acrylamide)-comprising copolymer binders may also comprise acrylic acid, carboxylic acid, alginic acid or metal salt(s) thereof (e.g., Na, K, Ca, Mg, Li, Sr, Cs, Ba, La and other salts of such acids). In some designs, such and other additions may be utilized to tune the ionic character of the polymer, its solubility and interactions with both the solvents and active (electrode) particles (e.g., to achieve stability of a slurry, etc.).

In some designs, anion conducting heterogeneous polymers (such as alkoxysilane/acrylate or epoxy alkoxysilane, etc.), various anion conducting interpenetrating polymer networks, various anion conducting poly (ionic liquids) (cross-linked ionic liquids) or poly(acrylonitriles), various anion conducting polyquaterniums, various anion conducting comprising quaternary ammonium salts (e.g., benzyltrialkylammonium tetraalkylammonium, trimethyl ammonium, dimethyl ammonium, diallyldimethylammonium, etc.), various anion conducting copolymers comprising ammonium groups, various anion conducting copolymers comprising norbornene, various anion conducting copolymers comprising cycloalkenes (e.g., cyclooctene), methacrylates, butyl acrylate, vinyl benzyl or poly(phenylene), various anion conducting copolymers comprising organochlorine compounds (e.g., epichlorohydrin, etc.), various anion conducting copolymers comprising ethers, bicyclic amines (e.g., quinuclidine), various anion conducting poly (ionic liquids) (cross-linked ionic liquids), various anion conducting copolymers comprising other amines (e.g., diamines such as ethylene diamine, monoamines, etc.), various anion conducting copolymers comprising poly(ether imides), various polysaccharides (e.g., chitosan, etc.), xylylene, guanidine, pyrodinium, among other units, may be advantageously used as copolymer binders (or components of the polymer/copolymer binder mixture) in the interlayer (or electrode layer or both) in the context of one or more embodiments of the present disclosure. In some designs, a copolymer binder may be cationic and highly charged.

In some designs, various cation conducting polymers (including interpenetrating polymer networks) and crosslinked ionic liquids (e.g., with cation conductivity above around $10^{-10}$ S sm$^{-1}$) may be advantageously used in the interlayer (or electrode layer or both) as binders or components of binders in the context of one or more embodiments of the present disclosure. In some designs, such polymers may advantageously exhibit medium-to-high conductivity (e.g., above around $10^{-10}$ S sm$^{-1}$, or more preferably above around $10^{-6}$ S sm$^{-1}$) for Li ions (in the case of Li or Li-ion batteries).

In some designs, various electrically conductive polymers or copolymers (e.g., preferably with electrical conductivity above around $10^{-2}$ S sm$^{-1}$), particularly those soluble in water (or at least processable in water-based electrode slurries) may be advantageously used as binders or components of binders (e.g., components of the binder mixtures or components of co-polymer binders) in the interlayer (or in the electrode or in both) in the context of one or more embodiments of this disclosure. In particular, sulfur (S) containing polymers/co-polymers, also comprising aromatic cycles, may be advantageously utilized. In some examples, S may be in the aromatic cycle (e.g., as in poly(thiophene)s (PT) or as in poly(3,4-ethylenedioxythiophene) (PEDOT)), while in other examples, S may be outside the aromatic cycle (e.g., as in poly(p-phenylene sulfide) (PPS)). In some designs, suitable conductive polymers/co-polymers may also comprise nitrogen (N) as a heteroatom. In some designs, the N atoms may, for example, be in the aromatic cycle (as in poly(pyrrole)s (PPY), polycarbazoles, polyindoles or polyazepines, etc.) or may be outside the aromatic cycle (e.g., as in polyanilines (PANT)). In some designs, some conductive polymers may have no heteroatoms (e.g., as in poly(fluorene)s, polyphenylenes, polypyrenes, polyazulenes, polynaphthalenes, etc.). In some designs, the main chain may comprise double bonds (e.g., as in poly(acetylene)s (PAC) or poly(p-phenylene vinylene) (PPV), etc.). In some designs, it may be advantageous for the polymer/copolymer binders to comprise ionomers (e.g., as in polyelectrolytes where ionic groups are covalently bonded to the polymer backbone or as in ionenes, where ionic group is a part of the actual polymer backbone). In some designs, it may be advantageous to use a polymer mixture of two or more ionomers. In some designs, such ionomers may carry the opposite charges (e.g., one negative and one positive). Examples of ionomers that may carry a negative charge include, but are not limited to, various deprotonated compounds (e.g., if parts of the sulfonyl group are deprotonated as in sulfonated polystyrene). Examples of ionomers that may carry a positive charge include, but are not limited to, various conjugated polymers, such as PEDOT, among others. An example of a suitable polymer mixture of two ionomers with the opposite charge is poly(3,4-ethylenedioxythiophene) polystyrene sulfonate. In some designs, it may be advantageous to use polymer binders that comprise both conductive polymers and another polymer, that provides another functionality (e.g., serve as an elastomer to significantly increase maximum binder elongation or serve to enhance bonding to active materials or current collector, or serve to enhance solubility in water or other slurry solvents, etc.).

In some designs, copolymer binders in the interlayer (or in the electrode active material layer or both) may advantageously comprise halide anions (e.g., chloride anions, fluoride anions, bromide anions, etc.). In some designs, copolymer binders may advantageously comprise ammonium cations (e.g., in addition to halide anion, as, for example, in ammonium chloride). In some designs, copolymer binders may advantageously comprise sulfur (S). In some designs, copolymer binders may advantageously comprise an allyl group (e.g., in addition to ammonium cations). For example, such copolymer binders may advantageously comprise diallyldimethylammonium chloride (DADMAC) or diallyldiethylammonium chloride (DADEAC). In some designs, other suitable examples of such copolymer binder components may include (but are not limited to): methylammonium chloride, N,N-diallyl-N-propylammonium chloride, methylammonium bromide, ethylammonium bromide, propylammonium bromide, butylammonium bromide, methylammonium fluoride, ethylammonium fluoride, propylammonium fluoride, butylammonium fluoride, to name a few.

In some designs, copolymer binders in the interlayer (or in the electrode active material layer or both) may comprise both poly(acrylamide) and ammonium halides (e.g, ammonium chloride) in their structure. As one suitable example, poly(acrylamide-co-di allyldimethylammonium chloride) (PAMAC) may be advantageously used as a copolymer binder in the context of the present disclosure. In some designs, such PAMAC copolymer binders may additionally comprise minor (e.g., less than around 5-10 wt. %) amounts of acrylic acid, carboxylic acid or alginic acid or metal salt(s) thereof (e.g., Na, K, Ca, Mg, Li, Sr, Cs, Ba, La and other salts of such acids).

In some designs, when forming a polymer binder-comprising interlayer between the polymer binder-comprising electrode and the current collector it may be important to make sure that the binder in the interlayer and the binder in the electrode are compatible with each other. For example, if the selected binders are incompatible with each other, the electrode may de-wet from the interlayer surface (e.g., after coating), form bubbles, reduce (instead of improving) adhesion or induce formation of species that may harm cell performance. In some designs, it may be advantageous for the polymer binders in the interlayer and the electrode to comprise the same functional groups. In some designs, it may be advantageous for the polymer binders in the interlayer and the electrode to comprise the same or approximately the same fractions of the same functional groups (e.g., within about 10% or less or, in some designs, within about 4% or less or, in some designs within about 2% or less). In some designs (particularly in case of aqueous slurries) it may be advantageous for the polymer binders in the interlayer and the electrode to exhibit the same or similar degree of hydrolysis (e.g. within about 10% or less or, in some designs, within about 4% or less or, in some designs within about 2% or less). In some designs, it may be advantageous for the polymer binders in the interlayer and the electrode to be of the same or approximately the same (e.g., within about 10% or less or, in some designs, within about 4% or less or, in some designs within about 2% or less) composition. In some designs, it may be advantageous for the polymer binders in the interlayer and the electrode to exhibit the same or similar molecular weight (e.g., within one order of magnitude). In some designs, it may be advantageous for the polymer binders in the interlayer and the electrode to comprise the same polymer or copolymer. In some designs, it may be advantageous for the polymer binders in the interlayer and the electrode to be exactly the same.

The nanocomposite particles described with respect to various embodiments of the present disclosure may generally be of any shape (e.g., near-spherical, cylindrical, plate-like, have a random shape, etc.) and of any size. In some designs, a maximum size of the particle may depend on the rate performance requirements, on the rate of the ion diffusion into the partially filled particles, and on other parameters.

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A Li-ion battery electrode, comprising:
a current collector;
an electrode layer arranged on the current collector, the electrode layer comprising active material particles mixed with a binder and conductive additives, wherein:
the active material particles are composite particles comprising an active material and exhibiting an average particle size in a range from about 0.2 μm to about 10 μm and an average areal capacity loading in a range of about 3 mAh/cm² to about 12 mAh/cm²;
the conductive additives comprise single-walled carbon nanotubes;
a concentration of the single-walled carbon nanotubes in a bulk of the electrode layer is in a range of 0.20 wt. % to 0.40 wt. %; and
a G/D band ratio of a Raman spectrum at a conductive interlayer of the electrode layer that is separate from the bulk of the electrode layer and is arranged between the bulk of the electrode layer and the current collector is in a range of about 20 to about 50.

2. The Li-ion battery electrode of claim 1, wherein the active material particles comprise silicon (Si).

3. The Li-ion battery electrode of claim 2, wherein the active material particles comprise nano-sized Si particles.

4. The Li-ion battery electrode of claim 2, wherein the active material particles comprise carbon (C).

5. The Li-ion battery electrode of claim 1, wherein the binder comprises a water-soluble polymer or water-dispersible polymer.

6. The Li-ion battery electrode of claim 1, wherein the binder comprises one or more of carboxymethyl cellulose (CMC), styrene butadiene rubber (SBR), polyvinylidene fluoride (PVDF), polyacrylic acid (PAA), and polyvinyl alcohol (PVA).

7. The Li-ion battery electrode of claim 1, wherein the conductive additives additionally comprise double-walled carbon nanotubes and/or multi-walled carbon nanotubes.

8. The Li-ion battery electrode of claim 1, wherein an average thickness of the conductive interlayer ranges from around 25 nm to around 500 nm.

9. The Li-ion battery electrode of claim 1, wherein the current collector is a metal foil with a thickness in a range from around 4 μm to around 15 μm.

10. The Li-ion battery electrode of claim 1, wherein the current collector is an electrodeposited metal foil.

11. A Li-ion battery comprising the Li-ion battery electrode of claim 1.

12. A method of making a Li-ion battery electrode, the method comprising:
mixing a binder, a solvent composition, conductive additives, and active material particles to form a uniform slurry;
coating a current collector with the slurry to obtain a slurry coating;
drying the slurry coating to obtain an electrode layer on the current collector; and
calendaring the electrode layer until a desired density is achieved,
wherein:
the active material particles are composite particles comprising an active material and exhibiting an average particle size in a range from about 0.2 μm to about 10 μm and an average areal capacity loading in a range of about 3 mAh/cm² to about 12 mAh/cm²;
the conductive additives comprise single-walled carbon nanotubes;
a concentration of the single-walled carbon nanotubes in a bulk of the electrode layer is in a range of 0.20 wt. % to 0.40 wt. %; and
a G/D band ratio of a Raman spectrum at a conductive interlayer of the electrode layer that is separate from the bulk of the electrode layer and is arranged between the bulk of the electrode layer and the current collector is in a range of about 20 to about 50.

13. The method of claim 12, wherein the solvent composition comprises water.

14. The method of claim 12, wherein the solvent composition comprises N-methyl-2-pyrrolidone.

15. The method of claim 12, wherein the active material particles comprise silicon (Si).

16. The method of claim 15, wherein the active material particles comprise nano-sized Si particles.

17. The method of claim 15, wherein the active material particles comprise carbon (C).

18. The method of claim 12, wherein the binder comprises a water-soluble polymer or water-dispersible polymer.

19. The method of claim 12, wherein the binder comprises one or more of carboxymethyl cellulose (CMC), styrene butadiene rubber (SBR), polyvinylidene fluoride (PVDF), polyacrylic acid (PAA), and polyvinyl alcohol (PVA).

20. The method of claim 12, wherein the conductive additives additionally comprise double-walled carbon nanotubes and/or multi-walled carbon nanotubes.

21. The method of claim 12, wherein an average thickness of the conductive interlayer ranges from around 25 nm to around 500 nm.

22. The method of claim 12, wherein the current collector is a metal foil with a thickness in a range from around 4 μm to around 15 μm.

23. The method of claim 12, wherein the current collector is an electrodeposited metal foil.

24. The Li-ion battery electrode of claim 1, wherein the concentration of the single-walled carbon nanotubes in the bulk of the electrode layer is in a range of 0.27 wt. % to 0.40 wt. %.

* * * * *